US012179328B2

(12) United States Patent
Yagi et al.

(10) Patent No.: US 12,179,328 B2
(45) Date of Patent: Dec. 31, 2024

(54) STAPLE REMOVAL DEVICE

(71) Applicant: MAX CO., LTD., Tokyo (JP)

(72) Inventors: Nobuaki Yagi, Tokyo (JP); Katsuya Hakozaki, Tokyo (JP)

(73) Assignee: MAX CO., LTD., Tokyo (JP)

( * ) Notice: Subject to any disclaimer, the term of this patent is extended or adjusted under 35 U.S.C. 154(b) by 412 days.

(21) Appl. No.: 17/631,185

(22) PCT Filed: Jul. 31, 2020

(86) PCT No.: PCT/JP2020/029514
§ 371 (c)(1),
(2) Date: Jan. 28, 2022

(87) PCT Pub. No.: WO2021/020572
PCT Pub. Date: Feb. 4, 2021

(65) Prior Publication Data
US 2022/0176533 A1 Jun. 9, 2022

(30) Foreign Application Priority Data
Aug. 1, 2019 (JP) ................................ 2019-142573

(51) Int. Cl.
*B25C 11/00* (2006.01)

(52) U.S. Cl.
CPC .................................. *B25C 11/00* (2013.01)

(58) Field of Classification Search
CPC ... B25C 11/00; B25C 5/00; B25C 5/16; B27F 7/19
See application file for complete search history.

(56) References Cited

U.S. PATENT DOCUMENTS 3,528,643 A * 9/1970 Ricci ...................... B25C 11/00 227/63
11,279,015 B2 * 3/2022 Hakozaki ............... B25C 11/00
(Continued)

FOREIGN PATENT DOCUMENTS

CN 2395852 Y 9/2000
CN 102730446 A 10/2012
(Continued)

OTHER PUBLICATIONS

Extended European Search Report dated Aug. 3, 2023, issued by the European Patent Office in the corresponding European Patent Application No. 20847620.0. (6 pages).
(Continued)

*Primary Examiner* — Lee D Wilson
(74) *Attorney, Agent, or Firm* — Banner & Witcoff, Ltd.

(57) ABSTRACT

A staple removing device includes a placing table on which a sheet bundle bound by a staple is placed; a removing part including a tip end portion that can be inserted between the sheet bundle and the staple and is configured to be movable along the placing table between a standby position and a removal position and to be inserted between the sheet bundle and the staple when the tip end portion moves to the removal position; a first motor configured to move the removing part; and an accommodation part configured to accommodate the staple removed by the removing part, wherein the first motor is located below the removing part when the tip end portion is at the standby position, and the accommodation part is located below the removing part when the tip end portion is at the removal position.

9 Claims, 19 Drawing Sheets

(56) References Cited

U.S. PATENT DOCUMENTS

| | | | | |
|---|---|---|---|---|
| 11,623,332 | B2 * | 4/2023 | Yagi | B25C 11/00 254/28 |
| 2012/0251288 | A1 | 10/2012 | Suzuki et al. | |
| 2013/0127108 | A1 * | 5/2013 | Shiraishi | B65H 3/08 271/11 |
| 2013/0206810 | A1 * | 8/2013 | Kato | B25C 5/025 227/68 |
| 2019/0184537 | A1 * | 6/2019 | Hakozaki | B25C 11/00 |
| 2021/0101270 | A1 | 4/2021 | Yagi et al. | |
| 2021/0402582 | A1 * | 12/2021 | Yagi | B25C 11/00 |
| 2022/0176533 | A1 * | 6/2022 | Yagi | B25C 11/00 |
| 2022/0274237 | A1 * | 9/2022 | Yagi | B25C 11/00 |
| 2023/0242372 | A1 * | 8/2023 | Jariabka | B65H 83/02 270/1.01 |

FOREIGN PATENT DOCUMENTS

| | | | |
|---|---|---|---|
| CN | 203371496 | U | 1/2014 |
| CN | 203600189 | U | 5/2014 |
| CN | 104589284 | A | 5/2015 |
| CN | 108855498 | A | 11/2018 |
| CN | 112621671 | A | 4/2021 |
| CN | 112996633 | A | 6/2021 |
| CN | 114174000 | A | 3/2022 |
| JP | 2000-131894 | A | 5/2000 |
| JP | 2012035350 | A | 2/2012 |
| JP | 2015-147271 | A | 8/2015 |
| JP | 2016-101653 | A | 6/2016 |
| JP | 2018-192563 | A | 12/2018 |
| JP | 2019-022923 | A | 2/2019 |
| WO | 2018/056360 | A1 | 3/2018 |
| WO | 2018/230060 | A1 | 12/2018 |

OTHER PUBLICATIONS

International Search Report (PCT/ISA/210) issued on Sep. 8, 2020, by the Japanese Patent Office as the International Searching Authority for International Application No. PCT/JP2020/029514. (5 pages).

Written Opinion (PCT/ISA/237) issued on Sep. 8, 2020, by the Japanese Patent Office as the International Searching Authority for International Application No. PCT/JP2020/029514. (4 pages).

* cited by examiner

STAPLE REMOVAL DEVICE

TECHNICAL FIELD

The present disclosure relates to a staple removing device.

BACKGROUND ART

In the related art, disclosed is a technology relating to a staple removing device configured to remove a staple from a sheet bundle (PTLs 1 and 2). This type of the staple removing device is configured to remove the staple from the sheet bundle by inserting a wedge-shaped plate between the sheet bundle and a crown portion of the staple.

PTL 1 discloses a sheet processing device configured to remove a staple from a sheet bundle by inserting a pullout pin between the sheet bundle and the staple, and then raising the pullout pin. In addition, PTL 2 discloses a binding member removing device configured to insert a cutting means between a document bundle and a staple needle, to cut both leg portions of the staple needle and then to remove the staple needle from the document bundle.

CITATION LIST

Patent Literature

PTL 1: JP-A-2016-101653
PTL 2: JP-A-2000-131894

SUMMARY OF INVENTION

Technical Problem

In the meantime, in the sheet processing device described in PTL 1, a pullout motor for operating the pullout pin and a drive motor for raising the pullout pin are respectively arranged above the pullout pin. For this reason, there is a problem that a dimension in a height direction of the device becomes large. On the other hand, in the binding member removing device described in PTL 2, an electric motor for driving the cutting means is arranged on a side of the cutting means. For this reason, there is a problem that a dimension in a width direction of the device becomes large.

Therefore, a staple removing device according to the present disclosure is to suppress dimensions in a height direction and a width direction of the device and to miniaturize the entire device.

Solution to Problem

A staple removing device of the present disclosure includes a placing table on which a sheet bundle bound by a staple is placed; a removing part located below the placing table, configured to remove the staple from the sheet bundle placed on the placing table, and including a tip end portion that can be inserted between the sheet bundle and the staple and is configured to be movable along the placing table between a first position and a second position and to be inserted between the sheet bundle and the staple when the tip end portion moves to the second position; a first motor configured to move the removing part, and an accommodation part configured to accommodate the staple removed by the removing part. In the staple removing device, the first motor is located below the removing part when the tip end portion is at the first position, and the accommodation part is located below the removing part when the tip end portion is at the second position.

Advantageous Effects of Invention

According to the staple removing device of the present disclosure, the accommodation part is arranged below the removing part when the removing part is at the second position, so that an empty space occurs below the removing part when the removing part is at the first position. By effectively utilizing the empty space and arranging the first motor therein, dimensions in a height direction and a width direction of the device can be suppressed. Thereby, the layout can be optimized and the entire device can be miniaturized.

DESCRIPTION OF EMBODIMENTS

Hereinafter, a favorable embodiment of the present disclosure will be described in detail with reference to the drawings.

Example of External Configuration of Staple Removing Device 1

Figure 1A:
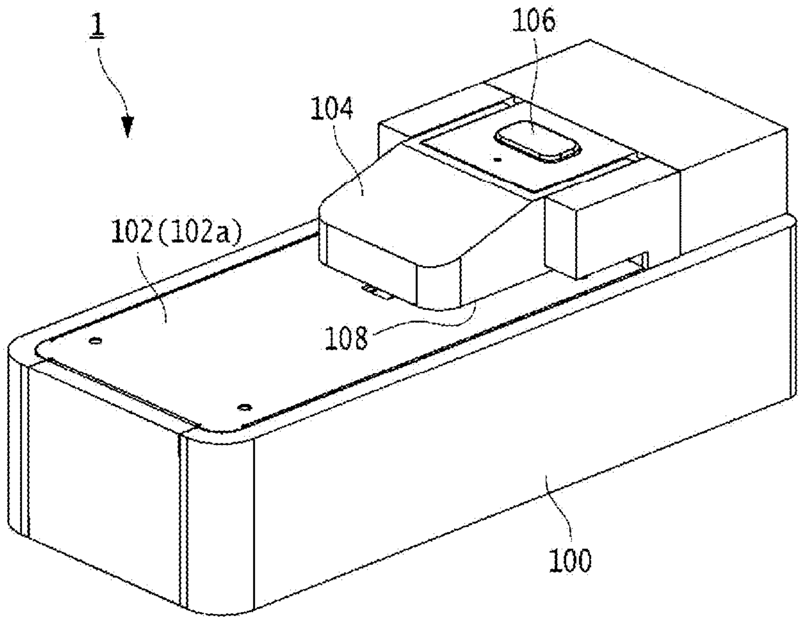
FIG. 1A is a front perspective view of a staple removing device.
Figure 1B:
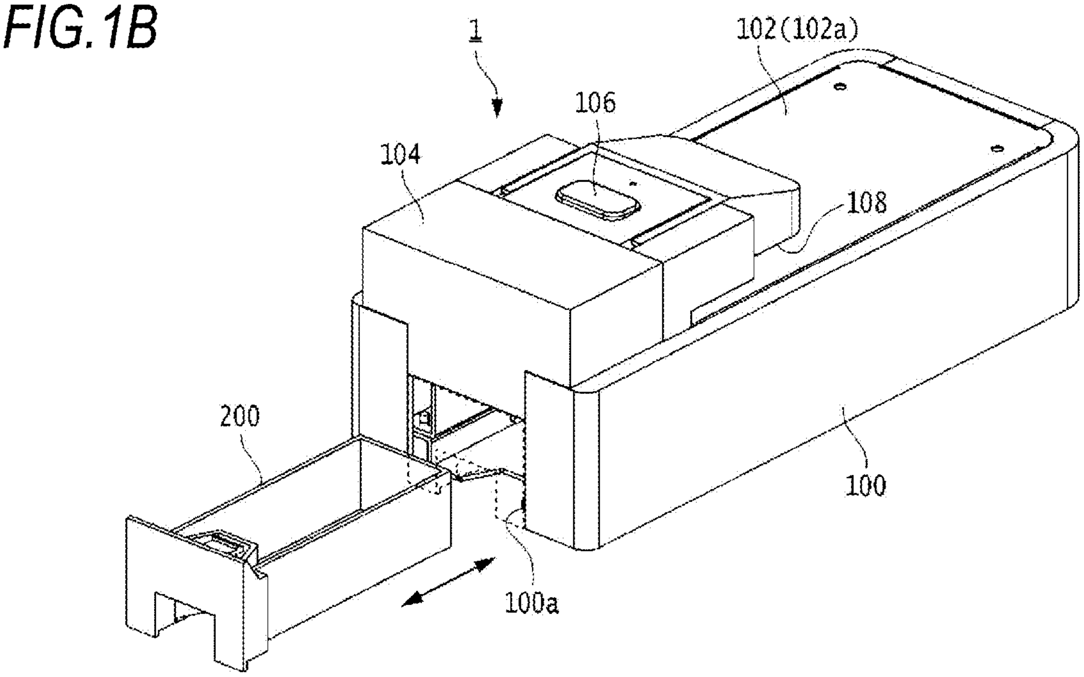
FIG. 1B is a rear perspective view of the staple removing device.
Figure 2A:
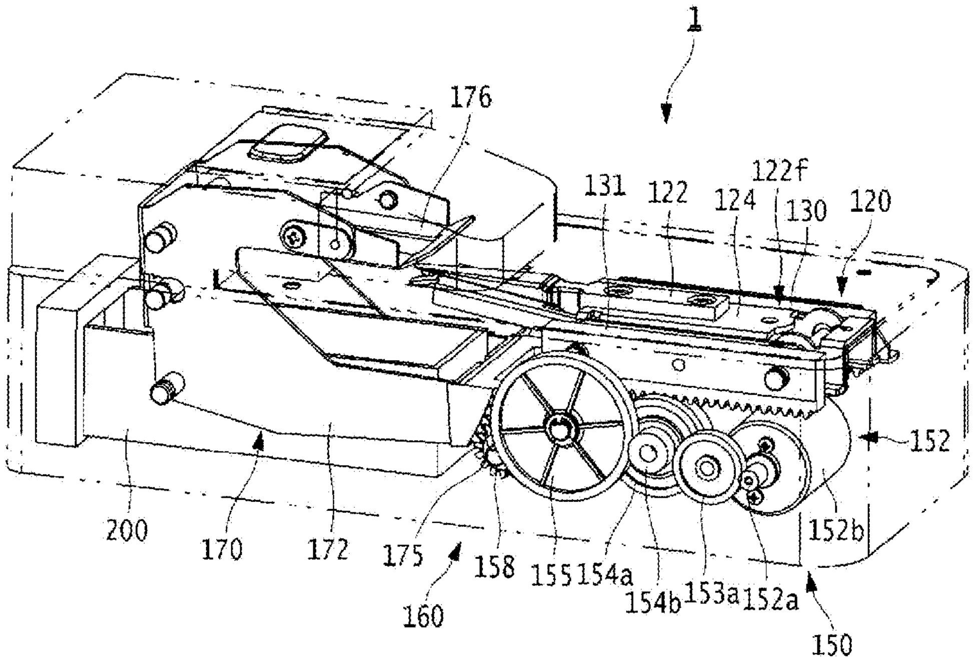
FIG. 2A is a right front perspective view of an inside of the staple removing device when a removing part is at a standby position.
Figure 2B:
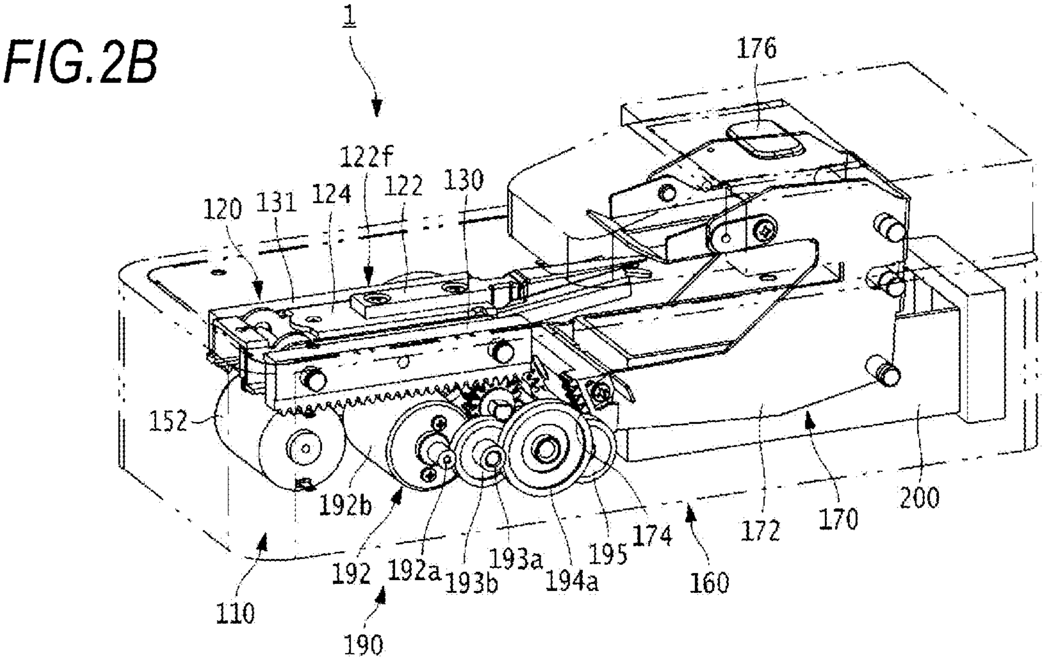
FIG. 2B is a left front perspective view of the inside of the staple removing device when the removing part is at the standby position.

FIG. 1A is a front perspective view of a staple removing device 1, and FIG. 1B is a rear perspective view of the staple removing device 1. In addition, FIG. 2A is a right front left rear perspective view of an inside of the staple removing device 1, and FIG. 2B is a left front right rear perspective view of the inside of the staple removing device 1.

The staple removing device 1 is a device for automatically removing a staple from a sheet bundle bound by the staple, and includes a housing 100 having a substantially cuboid shape, a placing table 102 on which the sheet bundle is placed, a removing part 120 located below the placing table 102 (inside the housing 100 with respect to the placing table 102) and configured to remove the staple from the sheet bundle placed on the placing table 102, a first motor 152 configured to drive the removing part 120, and an accommodation part 200 configured to accommodate the staple removed by the removing part 120.

A cover part 104 configured to cover a part of the placing table 102 is provided above the placing table 102 (a side on which the sheet bundle is placed with respect to the placing table 102). A predetermined gap is formed between the cover part 104 and the placing table 102, and the sheet bundle is inserted into the gap. A start switch 106 for operating the staple removal device 1 is provided on an upper surface of the cover part 104. Note that, in the present embodiment, a side on which the accommodation part 200 is provided is referred to as a rear side of the staple removing device 1, and an opposite side is referred to as a front side of the staple removing device 1.

The housing 100 is a substantially cuboid box body whose upper side is open, and is provided therein with the removing part 120, the first motor 152, the accommodation part 200, and the like.

The placing table 102 is provided to cover the upper opening of the housing 100, and has a placing surface 102*a* for placing a sheet bundle. The placing surface 102*a* is formed with an opening portion 102*b* so that a portion of the removing part 120 can protrude.

The removing part 120 has a predetermined length from a tip end portion 122*s* to a base end portion 122*k*. The removing part 120 has a wedge plate main body 122*a*, which is a first part including a tip end portion 122*s* that can be inserted between a sheet bundle and (a crown portion Sa of) a staple and configured to remove the staple from the sheet bundle, a wedge plate base portion 122*f*, which is a second part configured to drive by a drive force of the first motor 152 received by racks 130 and 131, and a narrowed portion 122*c*, which is a third part located between the first part and the second part.

The wedge plate main body 122*a* is constituted by an elongated plate-shaped member, and at least the tip end portion 122*s* thereof is formed in a wedge shape so as to be easily inserted between the sheet bundle and the staple and to easily pull out the staple from the sheet bundle. In the present embodiment, the wedge plate main body 122*a* has a tapered shape from the base end portion 122*k* toward the tip end portion 122*s*. Specifically, the wedge plate main body is configured so that a plate thickness gradually decreases from the base end portion 122*k* toward the tip end portion 122*s*, in side view, and is also configured so that a plate width gradually decreases toward the tip end portion 122*s*, in plan view.

The wedge plate base portion 122*f* has roles of supporting the wedge plate main body 122*a* via the narrowed portion

Figure 4:
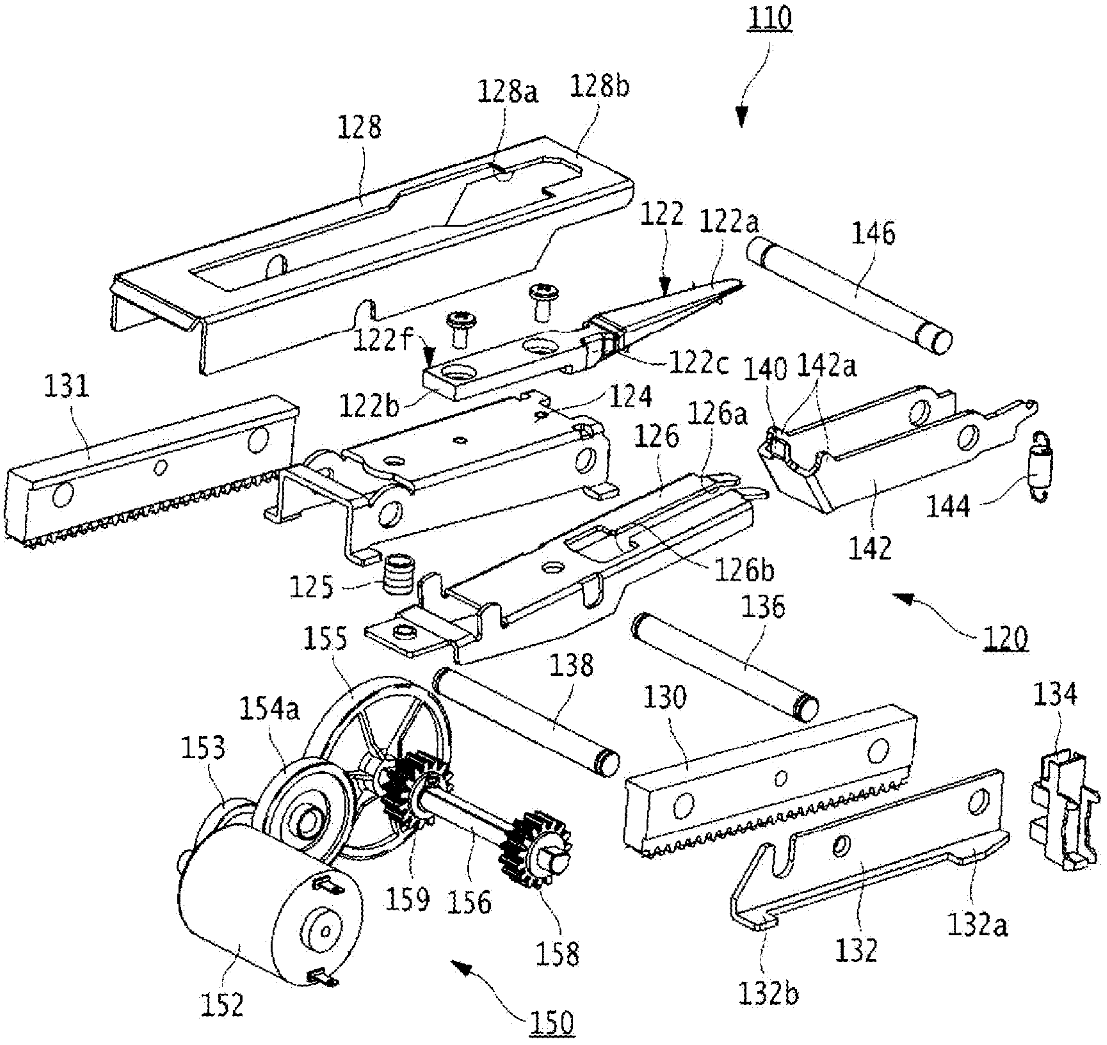
FIG. 4 is an exploded perspective view of a staple pullout mechanism.

122*c*, and receiving power from the first motor 152 by the racks 130 and 131 and transmitting the power to the wedge plate main body 122*a*. As shown in FIG. 4 and the like, the wedge plate base portion 122*f* has a plate holder 124 constituted by a flat plate having a substantially U-shaped section, and a pair of racks 130 and 131 attached to side surfaces of the plate holder 124. The wedge plate main body 122*a* and an attaching portion 122*b* extending from the wedge plate base portion 122*f* are attached to an upper surface of the plate holder 124. Each of the racks 130 and 131 is a plate-shaped member having substantially the same length as a longitudinal direction of the plate holder 124, is formed on its lower surface with a plurality of teeth (rack) in mesh with a pinion 158, which will be described later, and is configured to receive a drive force of the first motor 152.

A sheet bundle insertion opening 108 for setting a sheet bundle in the cover part 104 is provided between the placing table 102 and the cover part 104. The start switch 106 is provided on the upper surface of the cover part 104 so as for a user to easily operate, and is constituted by a button for operating the staple removing device 1. The accommodation part 200 is a box body whose upper side is open, and is configured to be insertable/removable with respect to an opening portion 100*a* formed on a rear end surface of the housing 100. The accommodation part 200 is arranged in a space part behind and below a central part in the housing 100.

Figure 17A:
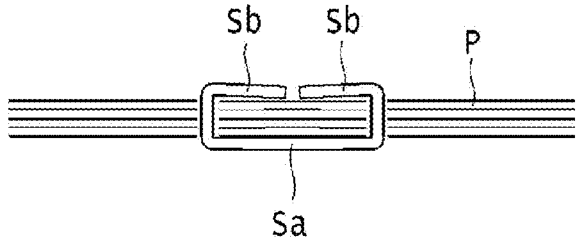
FIG. 17A shows states of the wedge plate and the staple when removing the staple from the sheet bundle.

Here, for convenience, a staple S in a state of binding a sheet bundle P is described with reference to FIG. 17A, which will be described later. The staple S has a crown portion Sa and a pair of leg portions Sb and Sb formed by bending both end portions in a longitudinal direction of the crown portion Sa. A sheet bundle P is bound by causing the pair of leg portions Sb and Sb of the staple S to penetrate a plurality of stacked sheets from the lowermost sheet toward the uppermost sheet and bending inwardly the penetrating leg portions Sb and Sb. A binding position of the staple S is, for example, a corner portion or an edge portion of the sheet. In the present embodiment, the staple S is removed from such sheet bundle P.

Example of External Configuration of Staple Removing Device 1

Figure 2C:
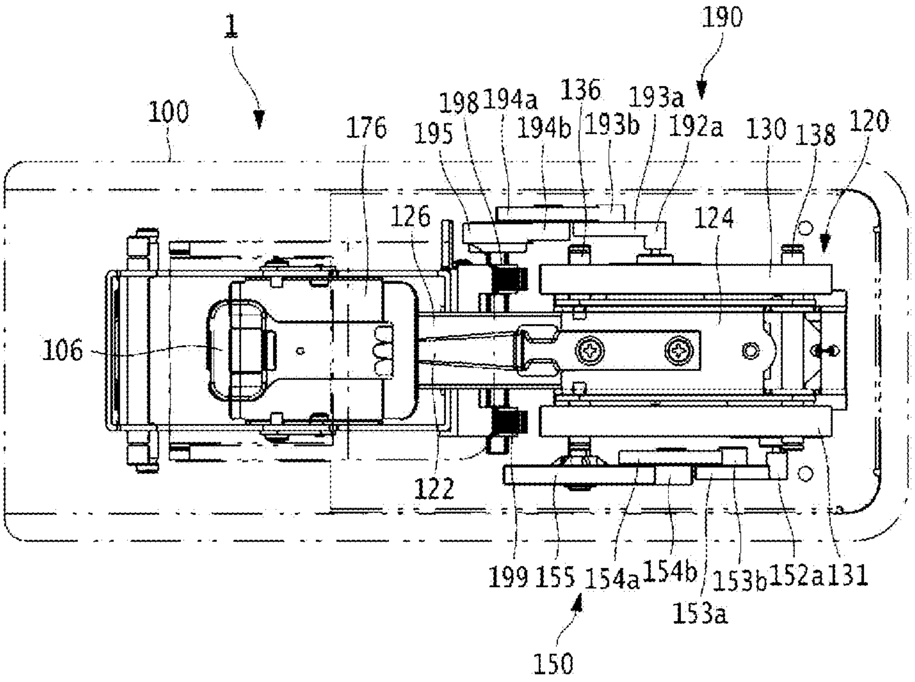
FIG. 2C is a plan view of the inside of the staple removing device when the removing part is at the standby position.
Figure 2D:
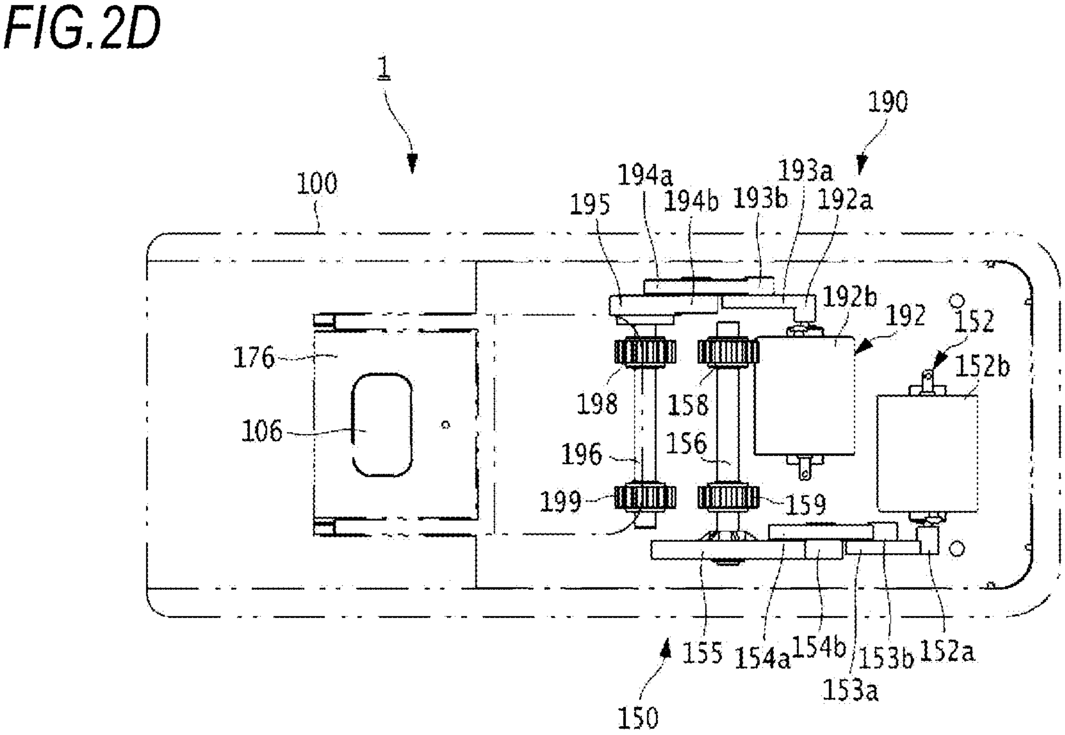
FIG. 2D is a plan view of the inside of the staple removing device.
Figure 2E:
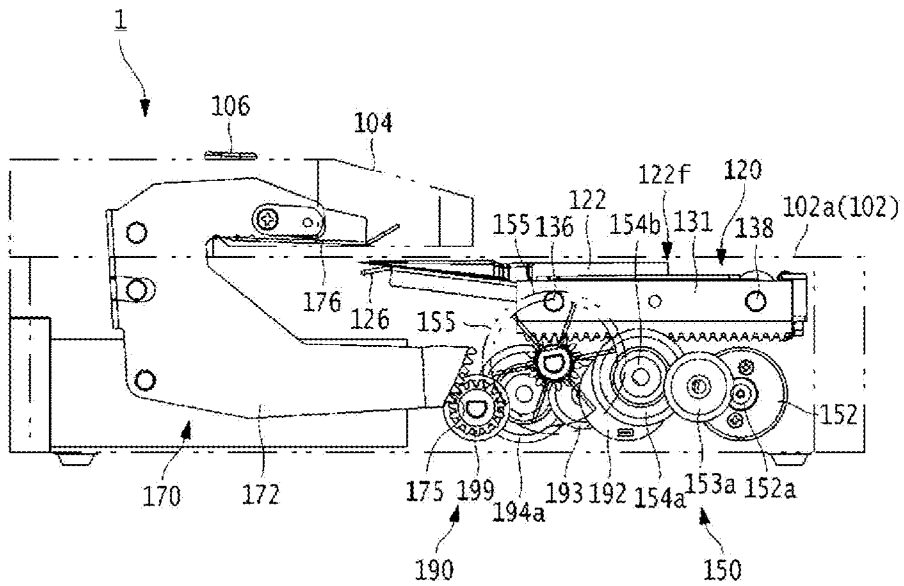
FIG. 2E is a side view of the inside of the staple removing device when the removing part is at the standby position.
Figure 3:
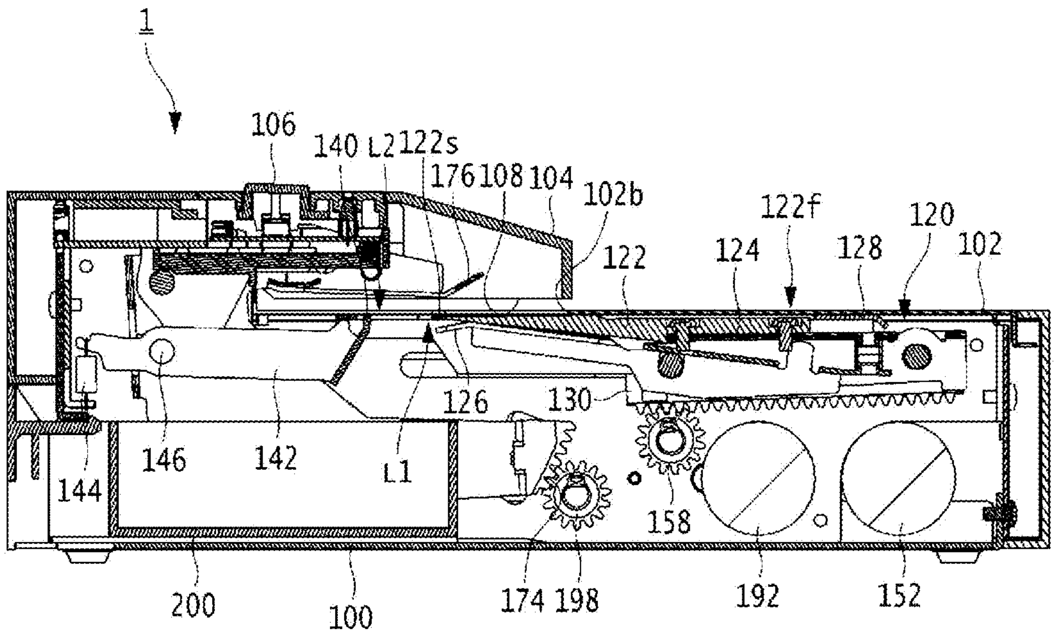
FIG. 3 is a side cross-sectional view of the inside of the staple removing device when the removing part is at the standby position.
Figure 5A:
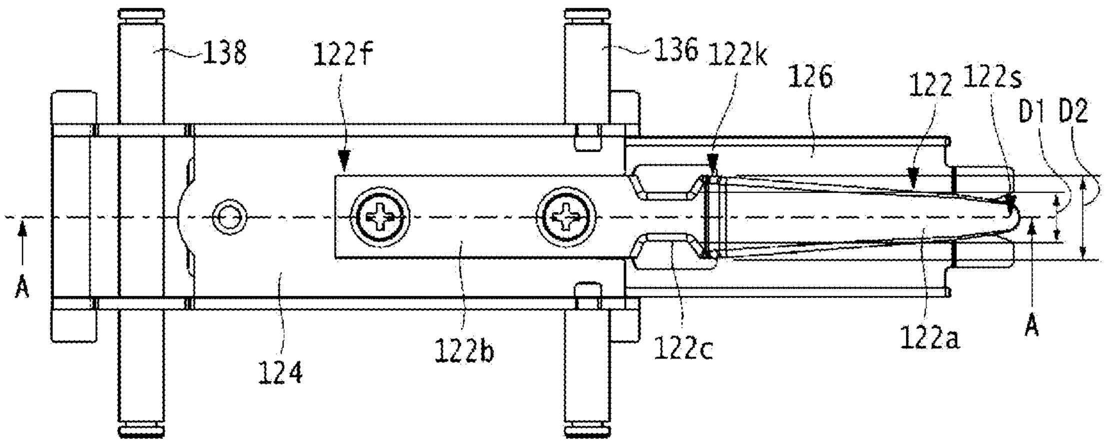
FIG. 5A is a plan view of the removing part.
Figure 5B:
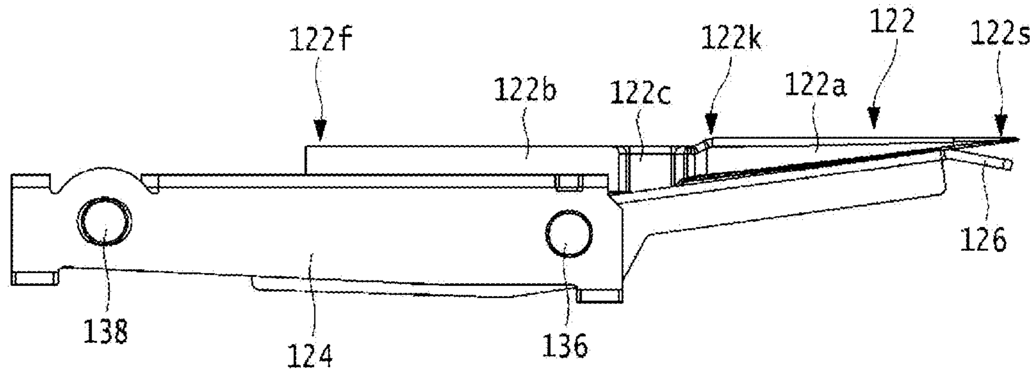
FIG. 5B is a side view of the removing part.
Figure 5C:
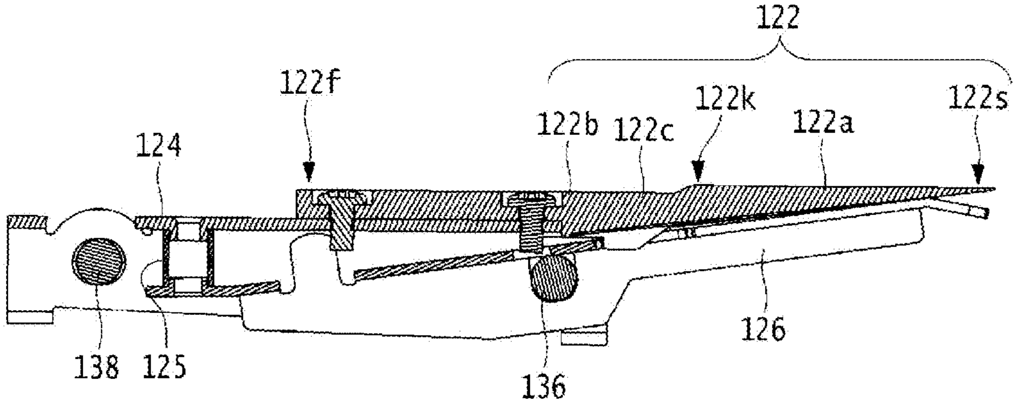
FIG. 5C is a cross-sectional view taken along an A-A line of the removing part shown in FIG. 5A.
Figure 6:
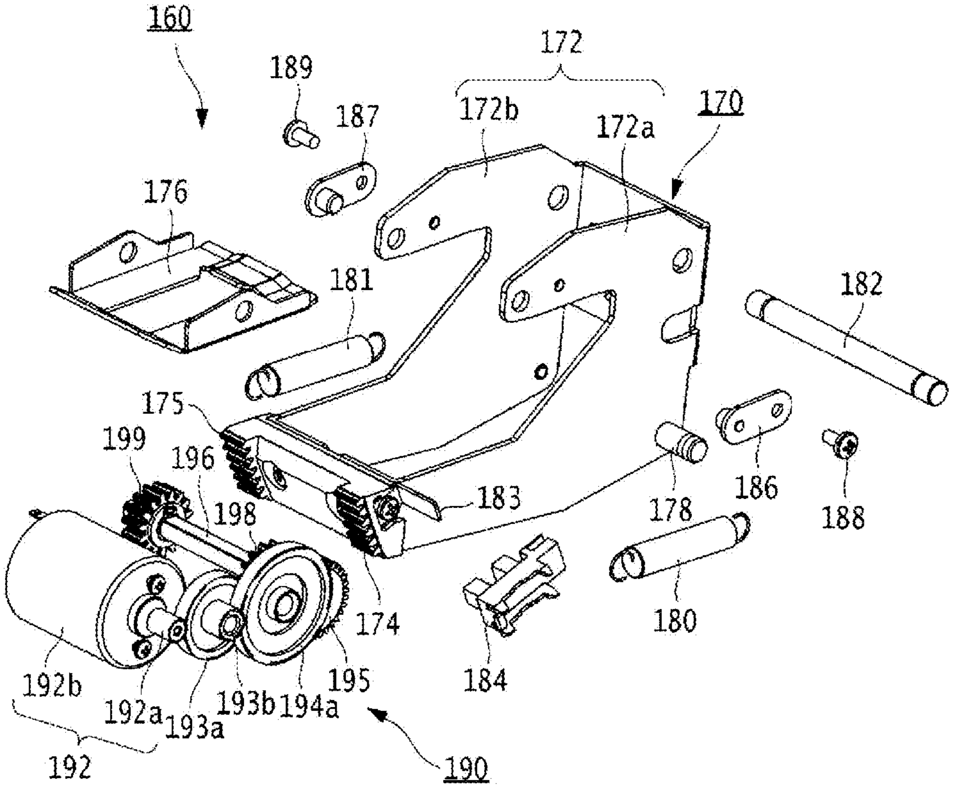
FIG. 6 is an exploded perspective view of a sheet pressing mechanism.

Next, an internal configuration of the staple removing device 1 is described. FIG. 2A is a right front perspective view of an inside of the staple removing device 1 when the removing part 120 is at a standby position, FIG. 2B is a left front perspective view of the inside of the staple removing device 1 when the removing part 120 is at the standby position, FIG. 2C is a plan view of the inside of the staple removing device 1 when the removing part 120 is at the standby position, FIG. 2D is a plan view of a first drive unit 150 and the like in the staple removing device 1, and FIG. 2E is a side view of the inside of the staple removing device 1 when the removing part 120 is at the standby position. FIG. 3 is a side cross-sectional view of the inside of the staple removing device 1 when the removing part 120 is at the standby position. FIG. 4 is an exploded perspective view of a staple pullout mechanism 110. FIG. 5A is a plan view of the removing part 120, FIG. 5B is a side view of the removing part 120, and FIG. 5C is a cross-sectional view taken along an A-A line of the removing part 120. FIG. 6 is an exploded perspective view of a sheet pressing mechanism 160.

The staple removing device 1 includes a staple pullout mechanism 110 configured to remove the staple S from the sheet bundle P, a sheet pressing mechanism 160 configured to press against the sheet bundle P placed on the placing table 102, and the above-described accommodation part 200.

Configuration Example of Staple Pullout Mechanism 110

As shown in FIG. 3 and the like, the staple pullout mechanism 110 includes the removing part 120 arranged inside the housing 100 below the placing surface 102*a* of the placing table 102 and configured to remove the staple S from the sheet bundle P by being inserted between the sheet bundle P and the staple, a pressing portion 140, and a first drive unit 150 configured to drive the removing part 120.

As shown in FIGS. 5A to 5C and 9A to 9B and the like, the removing part 120 has the wedge plate 122 configured to be inserted between the crown portion Sa of the staple S and the sheet bundle P, and the racks 130 and 131 configured to move the wedge plate 122 between the crown portion Sa and the sheet bundle P.

In the present embodiment, as an example of the configuration of the removing part 120, the removing part includes the plate holder 124 to which the wedge plate 122 is attached, a crown holder 126 configured to support the crown portion Sa of the staple S, and a holder 128 configured to restrict a position of the wedge plate 122.

As shown in FIGS. 4 and 5A to 5C, and the like, the wedge plate 122 is constituted by an elongated plate-shaped member, and includes the wedge plate main body 122*a*, the attaching portion 122*b*, and the narrowed portion 122*c*. The tip end portion 122*s* is configured to be movable along a plane of the placing table 102 between a standby position L1 and a removal position L2, and when the tip end portion 122*s* moves to the removal position L2, the tip end portion 122*s* is inserted between the sheet bundle P and the staple.

In the present embodiment, the standby position L1 of the removing part 120 means a position where the removing part 120 is stopped before a removing operation is started. The removal position L2 of the removing part 120 means a position where the removing part 120 starts a removing operation, the removing part 120 is inserted between the crown portion Sa of the staple S and the sheet bundle P, and the staple S is removed from the sheet bundle P.

The attaching portion 122*b* is integrally formed on the base end portion 122*k*-side of the wedge plate main body 122*a*, and is attached to an upper surface of the plate holder 124. The narrowed portion 122*c* is a substantially central portion in a longitudinal direction of the wedge plate 122, and is formed between the wedge plate main body 122*a* and the attaching portion 122*b*. As shown in FIG. 5A, a dimension D1 in the width direction of at least a part of the narrowed portion 122*c* is narrower than a dimension D2 in the width direction of the base end portion 122*k* of the wedge plate main body 122*a*, and is also configured to be narrower than a dimension D3 in the width direction (refer to FIG. 17E) between the leg portions Sb and Sb of the staple S by springback that the leg portions Sb and Sb of the staple S try to return to the inwardly bent state when the staple S separates from the wedge plate 122. Here, the 'width direction' is, in the present embodiment, a right and left direction, and may also be a direction perpendicular to a thickness direction (height direction) and a longitudinal direction (moving direction of the removing part 120) of the wedge plate 122.

As shown in FIG. 4 and the like, the plate holder 124 is constituted by a flat plate having a substantially U-shaped section, has an upper surface to which the attaching portion 122*b* is attached, and is arranged overlapped over the crown holder 126.

As shown in FIG. 4 and the like, the crown holder 126 is arranged below the wedge plate 122 with the plate holder 124 being interposed therebetween, and is configured to support the crown portion Sa of the staple S removed from the sheet bundle P. The crown holder 126 has a groove portion 126*a* for preventing contact with the pressing portion 140 when the wedge plate 122 moves rearward from the front, and an opening portion 126*b* for dropping the staple S removed from the sheet bundle P into the accommodation part 200. The opening portion 126*b* of the crown holder 126 and the narrowed portion 122*c* of the wedge plate 122 attached to the plate holder 124 are arranged to be at the same position, in plan view. The groove portion 126*a* is cut out from a tip end portion to a substantially central portion of the crown holder 126, and has a width slightly wider than a width of the pressing portion 140. The opening portion 126*b* is formed at a substantially central portion in the longitudinal direction of the crown holder 126 and continuously on a base end-side of the groove portion 126*a*, and has a width wider than at least a length of the crown portion Sa of the staple S.

A spring 125 is arranged between a lower surface on the other end-side of the plate holder 124 and an upper surface on the other end-side of the crown holder 126, and one end-side of the wedge plate 122 and one end-side of the crown holder 126 are urged in a direction of coming close to each other by an elastic force of the spring 125. In the present embodiment, one end-side indicates the rear of the staple removing device 1, and the other end-side indicates the front of the staple removing device 1.

The holder 128 is constituted by a flat plate having a substantially U-shaped section, and is arranged overlapped on the upper surface of the plate holder 124. The holder 128 includes an opening portion 128*a* for exposing the wedge plate 122, and a support portion 128*b* configured to regulate the pressing portion 140 to be located below the placing table 102 at least when the removing part 120 is stopped at the standby position L1.

As shown in FIGS. 2B and 4, on the left side of the plate holder 124, a plate-shaped rack 130 having substantially the same length as the longitudinal direction of the plate holder 124 is arranged. The rack 130 is configured to receive a drive force of the first motor 152. A lower surface of the rack 130 is formed with a plurality of teeth in mesh with a pinion 158, which will be described later.

As shown in FIGS. 2A and 4, on the right side of the plate holder 124, a plate-shaped rack 131 having substantially the same length as the longitudinal direction of the plate holder 124 is arranged. The rack 131 is configured to receive a drive force of the first motor 152.

A lower surface of the rack 131 is formed with a plurality of teeth in mesh with a pinion 159, which will be described later.

As shown in FIG. 4, on the left side of the rack 130, a sensor 134 configured to detect a position of the removing part 120 is provided and a flag attaching plate 132 for detecting a position of the removing part 120 in a front and rear direction is provided. A rear end portion of the flag attaching plate 132 is provided with a first flag 132*a* for detecting movement of the wedge plate 122 from the standby position L1 to the removal position L2. A front end portion of the flag attaching plate 132 is provided with a second flag 132*b* for detecting arrival of the wedge plate 122 at the removal position L2. The sensor 134 is constituted by a transmission-type sensor and is configured to detect the first flag 132*a* and the second flag 132*b* of the rack 130 moving in the front and rear direction. A detection signal detected by the sensor 134 is supplied to a control unit (not shown), and the control unit is configured to control operations of the first motor 152 and a second motor 192, based on the detection signal supplied from the sensor 134.

A first drive shaft 136 is inserted into opening portions formed in each of the flag attaching plate 132, the rack 130, the plate holder 124, the crown holder 126 and the rack 131 from the left side toward the left right side of the housing 100.

A second drive shaft 138 is inserted into opening portions formed in each of the flag attaching plate 132, the rack 130, the plate holder 124 and the rack 131 from the left side toward the right side of the housing 100.

In this way, the wedge plate 122, the plate holder 124, the crown holder 126, the holder 128, the racks 130, 131, and the flag attaching plate 132 are attached by the first drive shaft 136 and the second drive shaft 138, so that they constitute the removing part 120 and can integrally move forward and rearward as the removing part 120.

As shown in FIGS. 3 and 4, the pressing portion 140 configured to restrict movement of the sheet bundle P and the staple S in an insertion direction is arranged behind the crown portion Sa located at the removal position L2 and is configured to be able to come into contact with the crown portion Sa pushed by the wedge plate 122. A width of the pressing portion 140 is selected to be, for example, a length in which it can support the crown portion Sa moving rearward from the front by a pushing force of the wedge plate 122 and can be inserted into the groove portion 126*a* of the crown holder 126.

The pressing holder 142 configured to support the pressing portion 140 is constituted by a flat plate processed into a substantial U-shape in plan view, and a rear end-side of the pressing holder 142 is rotatably supported by a shaft 146. One end portion of a tension spring 144 is attached to the further rear of the pressing holder 142 than the shaft 146. The other end portion of the tension spring 144 is attached to a left frame 112. An upper end portion on the rear side of the pressing holder 142 is provided with a convex portion 142*a* capable of coming into contact with the support portion 128*b* of the holder 128.

As shown in FIGS. 2A, 2D and 4, the first drive unit 150 includes the first motor 152, a gear 153*a* and the like connected to an output shaft 152*a* of the first motor 152, and a pair of pinions 158 and 159 respectively provided at both ends of a shaft 156, which are a first pinion part arranged at a predetermined interval in the width direction of the housing 100 and configured to mesh with the racks 130 and 131. Note that, a plurality of gears 153*a*, 153*b*, 154*a*, 154*b* and 155 constitutes a speed reduction mechanism. The width direction of the housing 100 is, in the present embodiment, the right and left direction, and may also be a direction perpendicular to both the moving direction (front and rear direction) and the height direction of the removing part 120.

The first motor 152 has the output shaft 152*a* and a motor main body 152*b*, and is constituted by, for example, a DC motor, a DC brushless motor or the like. The first motor 152 is configured to drive based on an instruction from the control unit (not shown), thereby transmitting a drive force of the first motor 152 to the removing part 120 via the speed reduction mechanism and moving the removing part 120 forward or rearward. As shown in FIGS. 2C, 2D, 3 and the like, the first motor 152 is arranged below the removing part 120, in the present embodiment, a second part when the tip end portion 122*s* of the wedge plate main body 122*a* (first part) of the removing part 120 is at the standby position L1. Note that, the lower of the removing part 120 means that at least a part of the first motor 152 including the output shaft 152*a* is located directly under the removing part 120.

As shown in FIGS. 2D, 3 and the like, the first motor 152 is arranged so that the output shaft 152*a* is parallel to the placing surface 102*a* of the placing table 102.

In addition, the output shaft is arranged to be orthogonal to the moving direction (longitudinal direction of the housing 100) of the wedge plate 122 from the front to the rear.

In the present embodiment, the description 'the output shaft 152*a* is parallel to the placing surface 102*a* of the placing table 102' means not only a case of being perfectly parallel but also a range slightly deviating from the perfect parallelism. The range may be, for example, within ±5°, but may also be within ±10° depending on the required accuracy. Similarly, 'parallel', which will be described later, includes a case of being perfectly parallel and a slightly deviating range.

As shown in FIGS. 2A, 2C, 2D and 2E, the gears 153*a* and 153*b* are two-stage drive gears, and a diameter of the gear 153*a* is larger than a diameter of the gear 153*b*. The gear 153*a* is connected to the output shaft 152*a* of the first motor 152. The gear 153*b* is in mesh with the gear 154*a*. The gears 154*a* and 154*b* are two-stage drive gears, and a diameter of the gear 154*a* is larger than a diameter of the gear 154*b*. The gear 154*a* is in mesh with the gear 153*b*, and the gear 154*b* is in mesh with the gear 155. A right end portion of the shaft 156 extending in the width direction of the housing 100 is attached to a center of the gear 155. The pinion 159 in mesh with the rack 131 is attached to a left and right end-side of the shaft 156 on the gear 155-side, and the pinion 158 in mesh with the rack 130 is attached to the left end-side on an opposite side.

Configuration Example of Sheet Pressing Mechanism 160

As shown in FIGS. 2A, 6 and the like, the sheet pressing mechanism 160 configured to press against the sheet bundle P placed on the placing table 102 includes a sheet pressing part 170 having at least a part located above the placing table 102 and configured to be movable, and a second motor 192 configured to drive the sheet pressing part 170.

The sheet pressing part 170 has a hold lever 172 to which components constituting the sheet pressing part are attached, a pair of sheet pressing racks 174 and 175 extending in a traveling direction at a predetermined interval in the width direction of the housing 100, and a sheet pressing plate 176 configured to press the sheet bundle P placed on the placing table 102.

As shown in FIGS. 2A, 2E, 6 and the like, the hold lever 172 has a pair of flat plates 172*a* and 172*b* arranged on the rear and front sides of the housing 100 and arranged at a predetermined interval in the width direction. Lower sides of the flat plates 172*a* and 172*b* are arranged in the housing 100, and upper sides thereof are arranged to be exposed from the placing table 102 and are covered with the cover part 104. A boss 178 protruding outward is attached to an outer surface of the flat plate 172*a*. One end portion of a return spring 180 constituted by a tension spring is attached to the boss 178, and the other end portion of the return spring 180 is attached to the left frame 112. Similarly, a boss (not shown) is attached to an outer surface of the flat plate 172*b*, and one end portion of a return spring 181 is attached to the boss, and the other end portion of the return spring 181 is attached to a right frame 114.

The sheet pressing rack 174 is provided at a lower front rear end portion of the flat plate 172*a* of the hold lever 172. The sheet pressing rack 174 has a substantial fan shape and is in mesh with a sheet pressing pinion 198. The sheet pressing rack 175 is provided at a lower front rear end portion of the flat plate 172*b* of the hold lever 172. The sheet pressing rack 175 has a substantial fan shape and is in mesh with a sheet pressing pinion 199 of a second drive unit 190. The sheet pressing racks 174 and 175 are configured to convert rotational motions of the sheet pressing pinions 198 and 199 into substantially linear motions.

The sheet pressing plate 176 is configured to move toward the placing surface 102*a* so that the sheet bundle P does not deviate from the removing position L2 of the placing table 102 during a removing operation of the staple S, thereby pressing the sheet bundle P placed on the placing table 102. The sheet pressing plate 176 is attached to the flat plates 172*a* and 172*b* so as to be parallel to the placing table 102. Specifically, a left side surface of the sheet pressing plate 176 is supported by a shaft 186, and a right left side surface of the sheet pressing plate 176 is supported by a shaft 187.

As shown in FIGS. 2B, 2C, 2D and 6, the second drive unit 190 includes the second motor 192, a gear 193*a* and the like connected to an output shaft 192*a* of the second motor 192, and a pair of sheet pressing pinions 198 and 199 respectively provided at both ends of a shaft 196, which are a second pinion part arranged at a predetermined interval in the width direction of the housing 100 so as to mesh with the racks 174 and 175. Note that, a plurality of gears 193*a*, 193*b*, 194*a*, 194*b* and 195 constitutes a speed reduction mechanism. The second motor 192 is arranged below the removing part 120 when the removing part is located at the standby position L1.

The second motor 192 has the output shaft 192*a* and a motor main body 192*b*, and is constituted by, for example, a DC motor, a DC brushless motor or the like. The second motor 192 is configured to drive based on an instruction from the control unit (not shown), thereby transmitting a drive force of the second motor 192 to the sheet pressing part 170 via the speed reduction mechanism and operating the sheet pressing part 170. As shown in FIGS. 2C, 2D, 3 and the like, the second motor 192 is arranged ahead of and behind the first motor 152 and below the removing part 120, in the present embodiment, the second part when the tip end portion 122*s* of the wedge plate 122 of the removing part 120 is at the standby position L1. Note that, the lower of the removing part 120 means that at least a part of the second motor 192 including the output shaft 192*a* is located directly under the removing part 120.

As shown in FIGS. 2D, 3 and the like, the output shaft 192*a* of the second motor 192 is arranged to be parallel to the placing surface 102*a* of the placing table 102.

In addition, the output shaft is arranged to be orthogonal to the moving direction (longitudinal direction of the housing 100) of the wedge plate 122 from the front to the rear.

Further, the output shaft 192*a* of the second motor 192 is arranged to face toward an opposite side to the output shaft 152*a* of the first motor 152, preferably, to face toward an opposite direction to the output shaft 152*a* of the first motor 152. Specifically, the output shaft 152*a* of the first motor 152 is arranged to face rightward, and the output shaft 192*a* of the second motor 192 is arranged to face leftward on the opposite side thereto. The opposite direction means not only a case where the output shafts 152*a* and 192*a* are oriented in the opposite directions of 180 degrees but also a case where the output shafts are oriented in a range slightly deviating from the opposite directions of 180 degrees. The range may be, for example, within ±5°, but may also be within ±10° depending on the required accuracy.

In the present embodiment, the description 'the output shaft 192*a* is parallel to the placing surface 102*a* of the placing table 102' means not only a case of being perfectly parallel but also a case of slightly deviating from the perfect parallelism. The range may be, for example, within ±5°, but may also be within ±10° depending on the required accuracy.

As shown in FIGS. 2B, 2C, 2D, 2E and 6, the gears 193*a* and 193*b* are two-stage drive gears, and a diameter of the gear 193*a* is larger than a diameter of the gear 193*b*. The gear 193*a* is connected to the output shaft 192*a* of the second motor 192. The gear 193*b* is in mesh with the gear 194*a*. The gears 194*a* and 194*b* are two-stage drive gears, and a diameter of the gear 194*a* is larger than a diameter of the gear 194*b*. The gear 194*a* is in mesh with the gear 193*b*, and the gear 194*b* is in mesh with the gear 195. A left end portion of the shaft 196 extending in the width direction of the housing 100 is attached to a center of the gear 195. The sheet pressing pinion 198 in mesh with the sheet pressing rack 174 is attached to a left end-side of the shaft 196 on the gear 195-side, and the sheet pressing pinion 199 in mesh with the sheet pressing rack 175 is attached to a right end-side on an opposite side.

Configuration Example of Accommodation Part 200

As shown in FIGS. 2A, 2B, 3 and the like, the accommodation part 200 is located below the removing part 120 when the tip end portion 122*s* of the wedge plate 122 constituting the removing part 120 is at the removal position L2, so as to be able to accommodate the staple S dropping from the sheet bundle P. In addition, the accommodation part 200 is arranged in an empty space part between the flat plates 172*a* and 172*b* of the hold lever 172 constituting the sheet pressing mechanism 160 and below the pressing holder 142 constituting the staple pullout mechanism 110. At least a portion of the accommodation part 200 and a portion of the first motor 152 are arranged at the same height.

Configuration Example of Left Frame 112 and the Like

Figure 7:
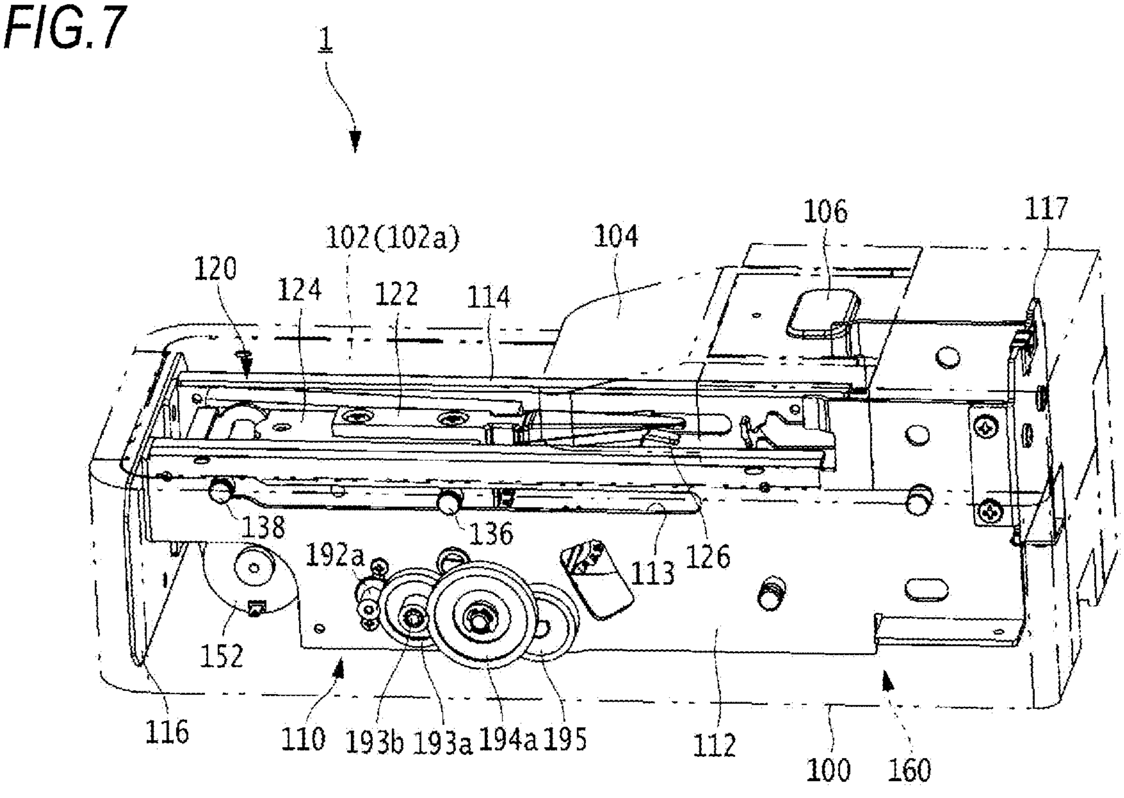
FIG. 7 is a perspective view of the inside of the staple removing device having a frame.
Figure 8:
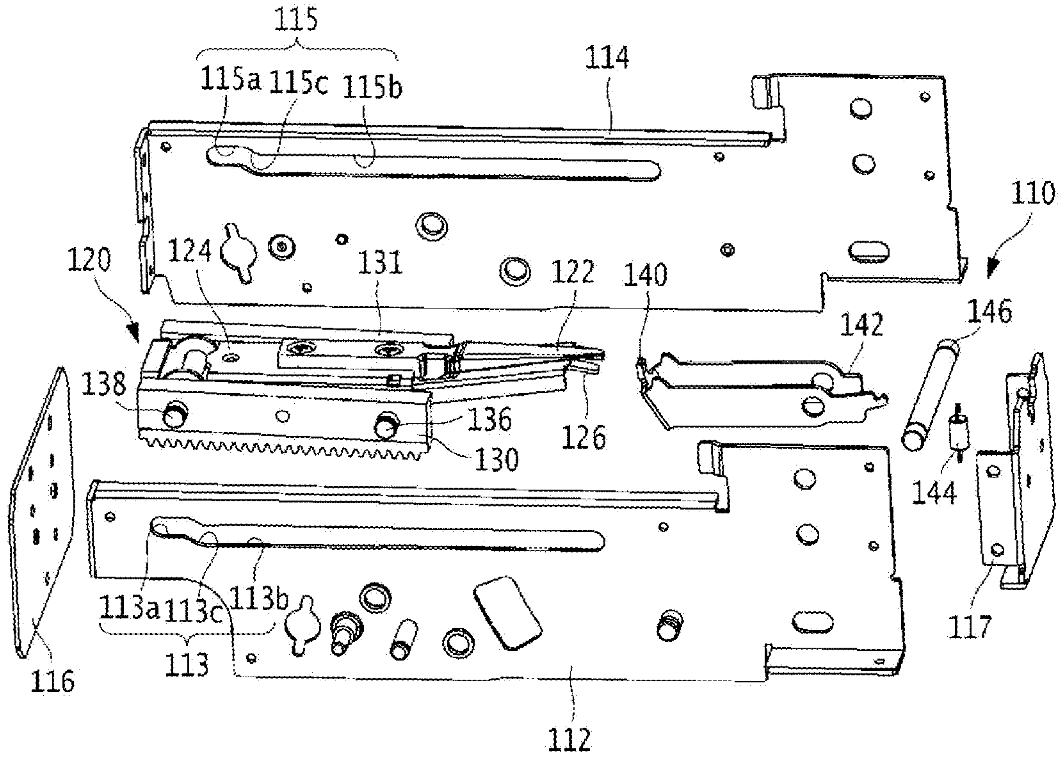
FIG. 8 is an exploded perspective view of the staple removing device having the frame.

FIG. 7 shows an internal configuration of the staple removing device 1 including a left frame 112, a right frame 114, a front frame 116 and a rear frame 117. FIG. 8 is an exploded perspective view of the staple removing device 1 shown in FIG. 7.

The left frame 112, the right frame 114, the front frame 116 and the rear frame 117 are erected on outer peripheral parts of the staple pulling mechanism 110 and the sheet pressing mechanism 160 so as to surround the same.

The left frame 112 is erected on a left side of the staple pullout mechanism 110. A guide groove 113 extending along the moving direction (longitudinal direction of the housing 100) ahead of or behind the removing part 120 is formed in an upper portion of the left frame 112. The guide groove 113 includes a first groove 113*a* for locating, below the placing table 102, the tip end portion 122*s* of the wedge plate 122 of the removing part 120 standing by at the standby position L1, and a second groove 113*b* for moving the tip end portion 122*s* of the wedge plate 122 of the removing part 120 in a state of protruding from the placing table 102 until passing through the removal position L2 from a front of the removal position L2. The second groove 113*b* is formed at a position slightly lower than the first groove 113*a* via a step portion 113*c*. The left end portions of the first drive shaft 136 and the second drive shaft 138 of the removing part 120 are inserted in the guide groove 113. Thereby, the removing part 120 can move along the guide groove 113, and can move forward and rearward along the placing table 102.

The right frame 114 is erected on a right side of the staple pullout mechanism 110. A guide groove 115 extending along the moving direction (longitudinal direction of the housing 100) ahead of or behind the removing part 120 is formed in an upper portion of the right frame 114. The guide groove 115 includes a first groove 115*a* for locating, below the placing table 102, the tip end portion 122*s* of the wedge plate 122 of the removing part 120 standing by at the standby position L1, and a second groove 115*b* for moving the tip end portion 122*s* of the wedge plate 122 of the removing part 120 in a state of protruding from the placing table 102 until passing through the removal position L2 from a front of the removal position L2. The second groove 115*b* is formed at a position slightly lower than the first groove 115*a* via a step portion 115*c*. The right end portions of the first drive shaft 136 and the second drive shaft 138 of the removing part 120 are inserted in the guide groove 115. Thereby, the removing part 120 can move along the guide groove 115, and can move forward and rearward along the placing table 102.

The front frame 116 is erected on a front side of the staple pulling mechanism 110, and the rear frame 117 is erected on a rear side of the sheet pressing mechanism 160.

Operation Example of Staple Pullout Mechanism 110

Next, an example of an operation of the staple pullout mechanism 110 that is performed when removing the staple S from the sheet bundle P is described.

Figure 9A:
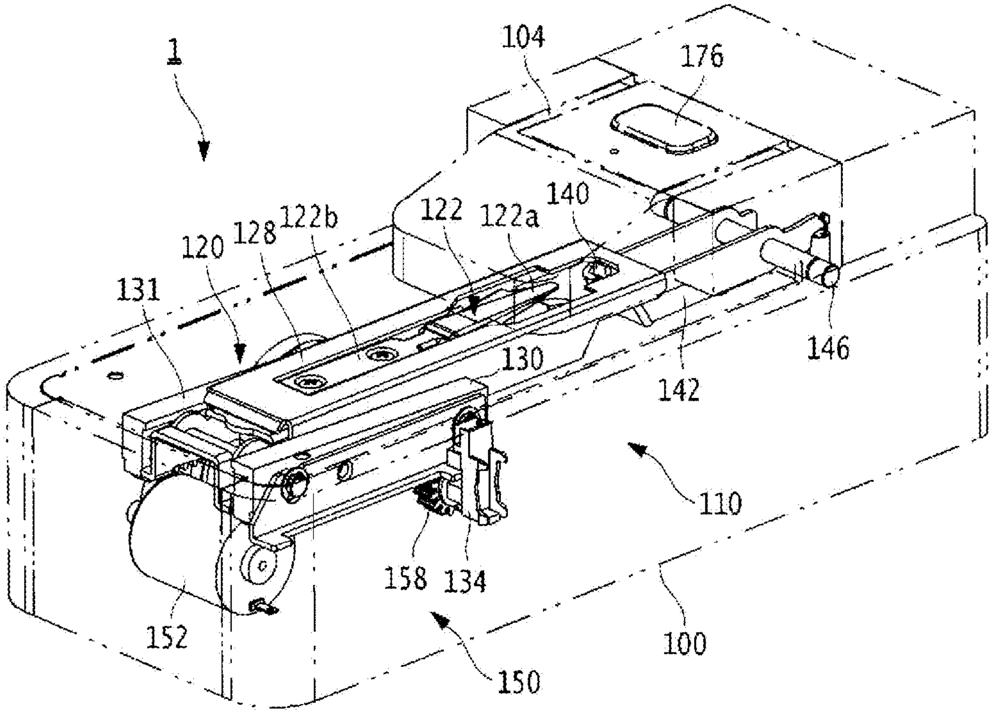
FIG. 9A is a perspective view showing an operation of a staple pullout mechanism located at the standby position.
Figure 9B:
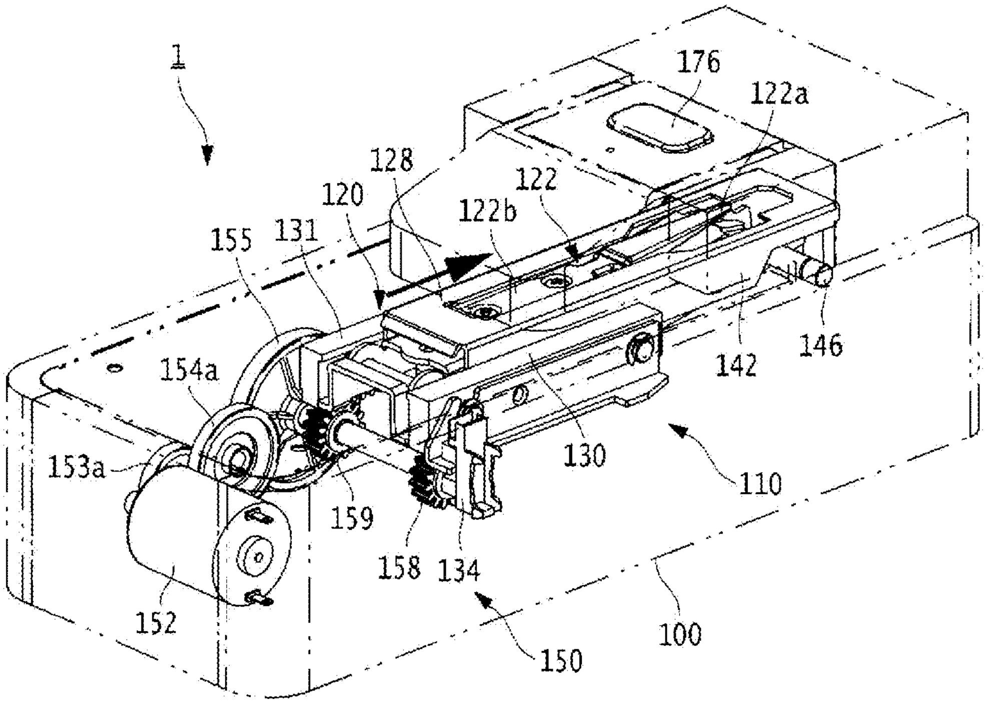
FIG. 9B is a perspective view showing an operation of the staple pullout mechanism moving to a removal position.
Figure 10A:
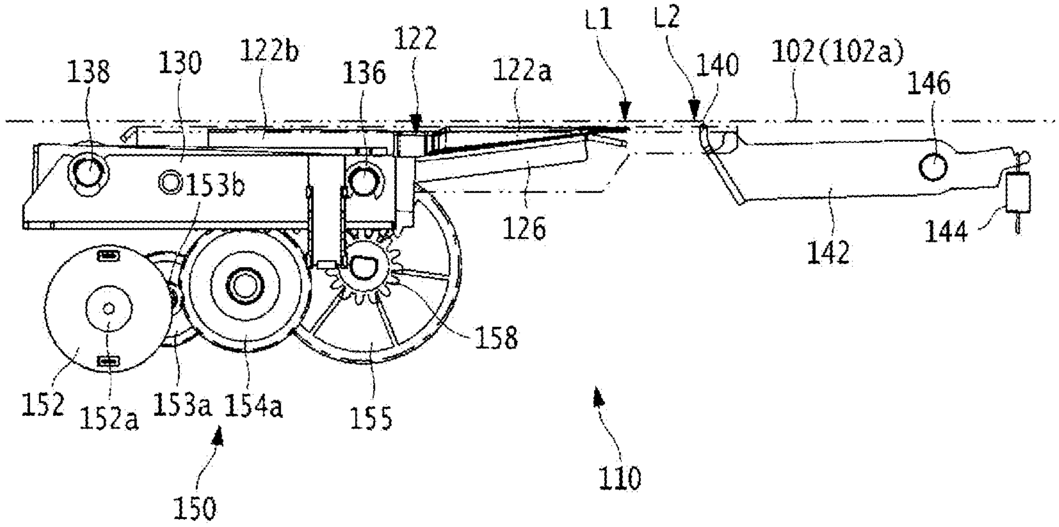
FIG. 10A is a side view of main parts showing the operation of the staple pullout mechanism located at the standby position.
Figure 10B:
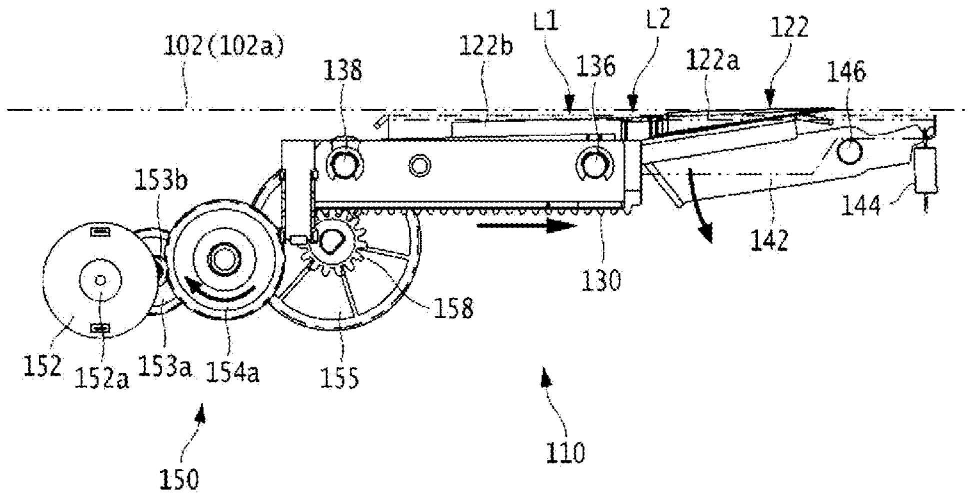
FIG. 10B is a side view of main parts showing the operation of the staple pullout mechanism moving to the removal position.
Figure 11A:
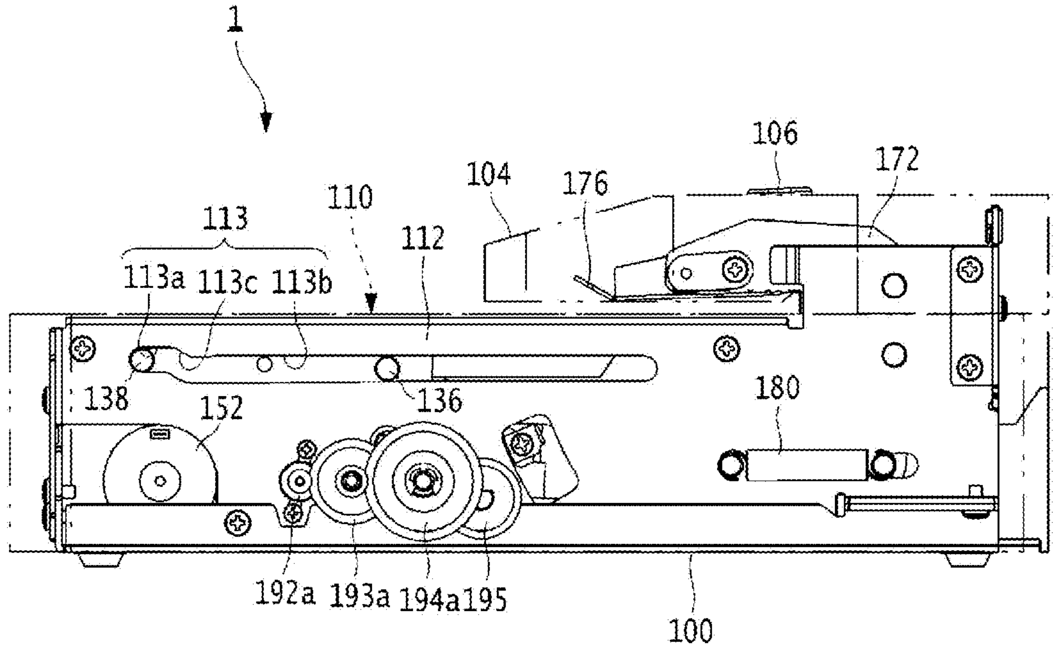
FIG. 11A is a side view showing the operation of the staple pullout mechanism located at the standby position.
Figure 11B:
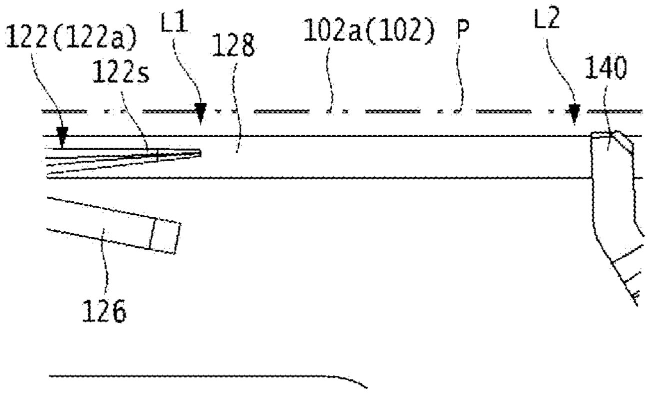
FIG. 11B is a side view of main parts showing the operation of the staple pullout mechanism shown in FIG. 11A.
Figure 12A:
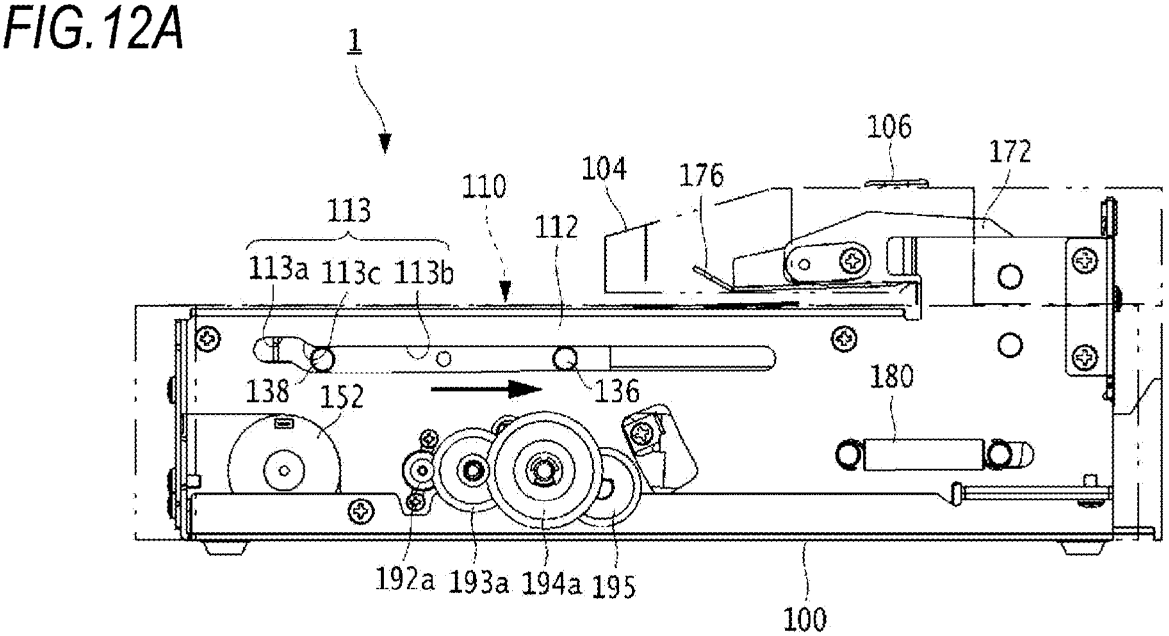
FIG. 12A is a side view showing the operation of the staple pullout mechanism moving to the removal position.
Figure 12B:
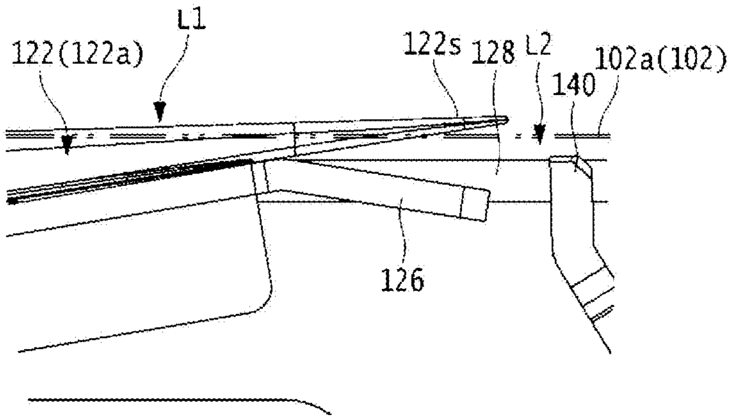
FIG. 12B is a side view of main parts showing the operation of the staple pullout mechanism shown in FIG. 12A.

FIG. 9A is a perspective view showing an operation of the staple pullout mechanism 110 located at the standby position L1, and FIG. 9B is a perspective view showing an operation of the staple pullout mechanism 110 moving to the removal position L2. FIG. 10A is a side view of main parts showing the operation of the staple pullout mechanism 110 located at the standby position L1, and FIG. 10B is a side view of main parts showing the operation of the staple pullout mechanism moving to the removal position L2. FIG. 11A is a side view showing the operation of the staple pullout mechanism 110 located at the standby position L1, and FIG. 11B is a side view of main parts showing the operation of the staple pullout mechanism 110 shown in FIG. 11A. FIG. 12A is a side view showing the operation of the staple pullout mechanism 110 moving to the removal position L2, and FIG. 12B is a side view of main parts showing the operation of the staple pullout mechanism 110 shown in FIG. 12A. Note that, for convenience, in FIGS. 11A to 11B and 12A to 12B, only the left frame 112-side is described. However, it is assumed that the right frame 114-side on the opposite side can also adopt the similar operations to the left frame 112-side.

When the staple removing device 1 is in a standby state, the wedge plate 122 is stopped at the standby position L1 of the housing 100, as shown in FIGS. 9A, 10A and 11A. At this time, the second drive shaft 138 is located in the first groove 113*a* of the guide groove 113 of the left frame 112, and the first drive shaft 136 is located in the second groove 113*b* of the guide groove 113 of the left frame 112. For this reason, the attaching portion 122*b*-side of the wedge plate 122 is in a lifted state, and the wedge plate main body 122*a*-side including the tip end portion 122*s* of the wedge plate 122 is at a position lower than the attaching portion 122*b*-side. Thereby, as shown in FIG. 11B, when the tip end portion 122*s* of the removing part 120 is at the standby position L1, the wedge plate main body 122*a* including the tip end portion 122*s* of the wedge plate 122 is located below the placing surface 102*a* of the placing table 102. Thereby, when placing the sheet bundle P on the placing table 102, it is possible to prevent a malfunction that the wedge plate 122 collides with the sheet bundle P, and therefore, is separated from the placing table.

When the start switch 106 of the staple removing device 1 is operated, as shown in FIGS. 9B and 10B, the first motor 152 is driven, and the drive force of the first motor 152 is transmitted to the pinions 158 and 159 via the plurality of gears 153*a*, 153*b*, 154*a*, 154*b* and 155. Along with this, the pinions 158 and 159 rotate in a clockwise direction in FIG. 10B, and the racks 130 and 131 in mesh with the pinions 158 and 159 move rearward from the front along the placing table 102, so that the wedge plate 122 moves rearward from the front.

At this time, as shown in FIG. 12A, the second drive shaft 138 moves from the first groove 113*a* of the guide groove 113 of the left frame 112 to the second groove 113*b*. For this reason, the position of the wedge plate 122 on the attaching portion 122*b*-side is lowered, so that the wedge plate main body 122*a*-side of the wedge plate 122 is lifted with the first drive shaft 136 as a fulcrum. Here, since the upper surface of the wedge plate main body 122*a* has a structure slightly protruding further than the upper surface of the attaching portion 122*b*, as shown in FIG. 12B, the tip end portion 122*s* of the wedge plate 122 is located above the placing surface 102*a* of the placing table 102. In the present embodiment, the wedge plate 122 moves while maintaining the state of protruding from the placing surface 102*a* of the placing table 102 via the opening portion 102*b* of the placing table 102 until passing through the removal position L2 from the front of the removal position L2. Thereby, the tip end portion 122*s* of the wedge plate main body 122*a* is surely pushed between the sheet bundle P and the crown portion Sa.

Operation Example of Sheet Pressing Mechanism 160

Next, an example of an operation of the staple pressing mechanism 160 that is performed when removing the staple S from the sheet bundle P is described.

Figure 13A:
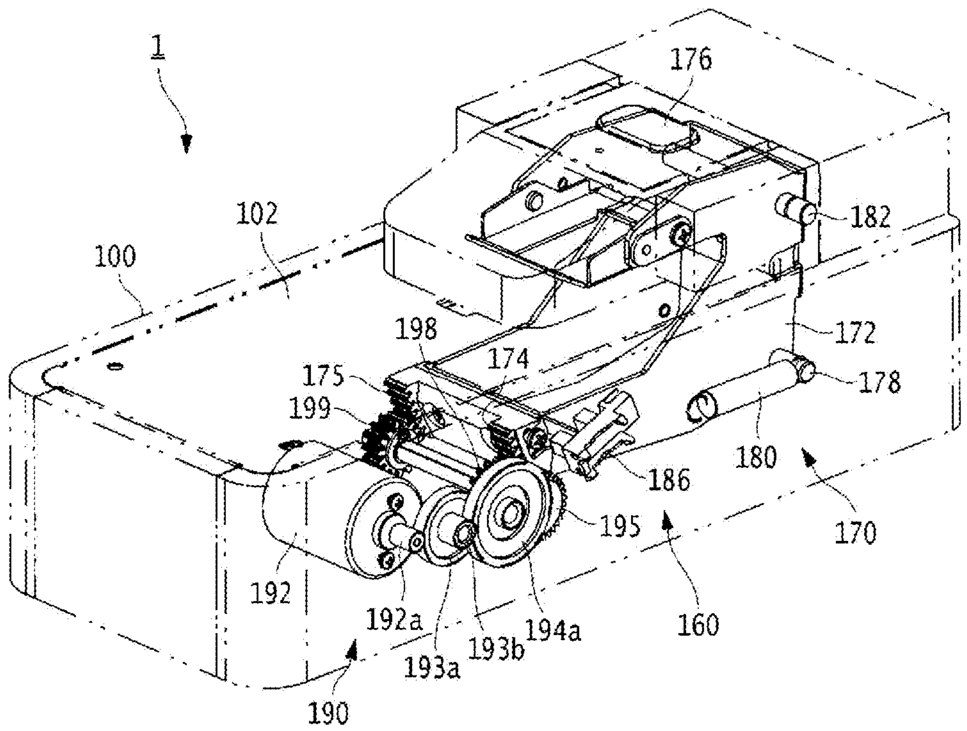
FIG. 13A is a perspective view showing an operation of the sheet pressing mechanism located at the standby position.
Figure 13B:
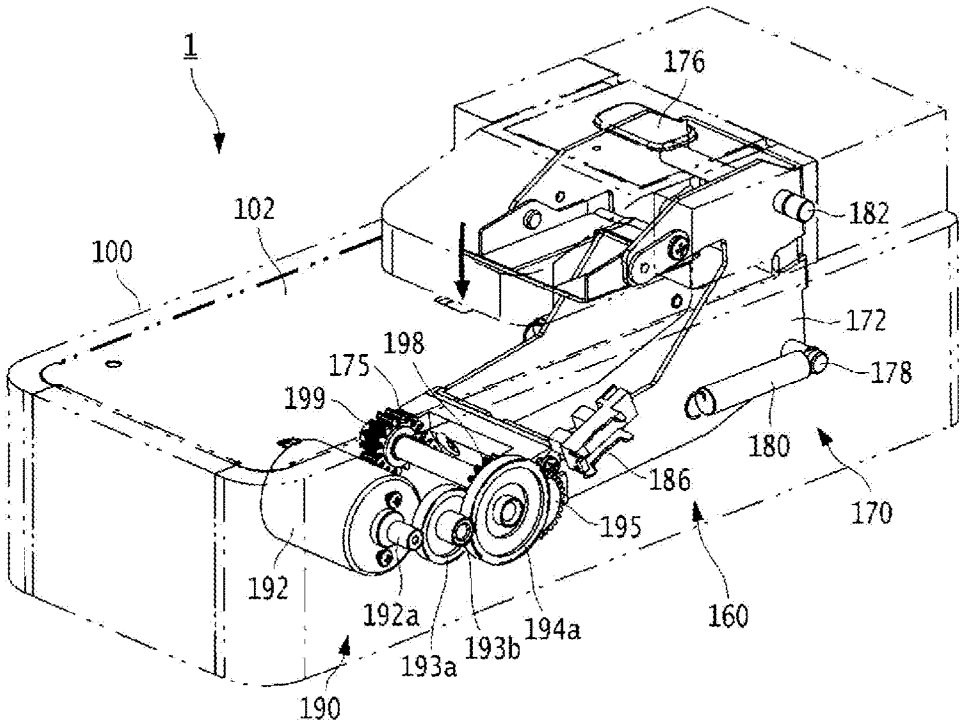
FIG. 13B is a perspective view showing an operation of the sheet pressing mechanism moving to a pressing position.
Figure 14A:
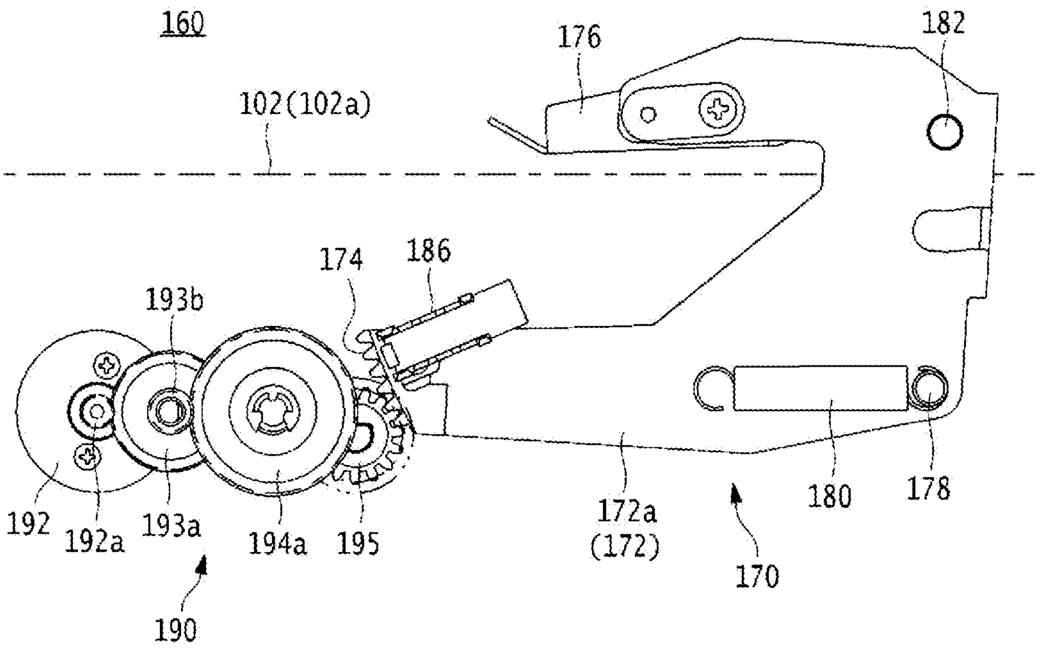
FIG. 14A is a side view of main parts showing the operation of the sheet pressing mechanism located at the standby position.
Figure 14B:
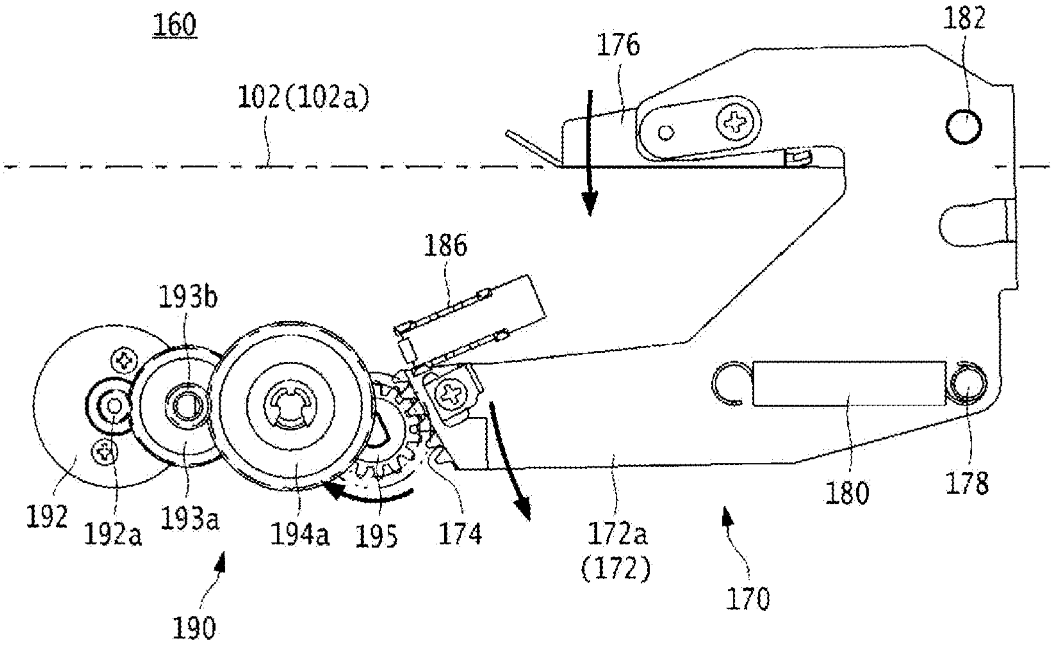
FIG. 14B is a side view of main parts showing the operation of the sheet pressing mechanism moving to the pressing position.

FIG. 13A is a perspective view showing an operation of the sheet pressing mechanism 160 located at the standby position, and FIG. 13B is a perspective view showing an operation of the sheet pressing mechanism 160 moving to a pressing position. FIG. 14A is a side view of main parts showing the operation of the sheet pressing mechanism 160 located at the standby position, and FIG. 14B is a side view of main parts showing the operation of the sheet pressing mechanism 160 moving to the pressing position.

As shown in FIGS. 13A and 14A, when the staple removing device 1 is at the standby position, the sheet pressing plate 176 is stopped at a position at a certain interval from the placing surface 102*a* of the placing table 102. The certain interval is an interval at which the lower surface of the sheet pressing plate 176 does not come into contact with the uppermost sheet of the sheet bundle P placed on the placing table 102.

When the start switch of the staple removing device 1 becomes on, the second motor 192 is driven. The drive force of the second motor 192 is transmitted to the sheet pressing pinions 198 and 199 via the gears 193*a*, 193*b*, 194*a*, 194*b* and 195. Along with this, as shown in FIGS. 13B and 14B, the sheet pressing pinions 198 and 199 rotate in the clockwise direction, and the sheet pressing racks 174 and 175 in mesh with the sheet pressing pinions 198 and 199 move substantially downward. When the sheet pressing racks 174 and 175 move substantially downward, the hold lever 172 rotates in a counterclockwise direction with the hold lever shaft 182 as a fulcrum against the elastic force of the return spring 180, and the sheet pressing plate 176 moves (descends) in a direction toward the placing table 102. Thereby, the sheet bundle P placed on the placing table 102 is pressed with a certain pressing force by the sheet pressing plate 176.

When the operation of removing the staple S from the sheet bundle P is over, the second motor 192 is driven in reverse rotation. Thereby, the sheet pressing plate 176 moves (ascends) in a direction away from the sheet bundle P and returns to the standby position shown in FIG. 14A and the like.

Operation Example of Staple Removing Device 1

Next, an operation and the like of the staple removing device 1 that is performed when removing the staple S from the sheet bundle P are described. Note that, since the operations of the staple pullout mechanism 110 and the sheet pressing mechanism 160 are similar to those in FIGS. 9A, 13A and the like, the detailed descriptions thereof are omitted.

FIGS. 15A to 15G are side views showing an example of an operation of the staple removing device 1 that is performed when pulling out the staple S from the sheet bundle P are described. FIGS. 16A to 16E are enlarged views of main parts showing an example of an operation of the wedge plate 122 when pulling out the staple S from the sheet bundle P. FIGS. 17A to 17E show states of the wedge plate 122 and the staple S when pulling out the staple S from the sheet bundle P. Note that, in the descriptions of FIG. 15A and the like, for convenience, only an operation on the right side of the staple removing device 1 is described. However, it is assumed that the left side on an opposite side can also adopt the similar operation to that of the right side.

Figure 15A:
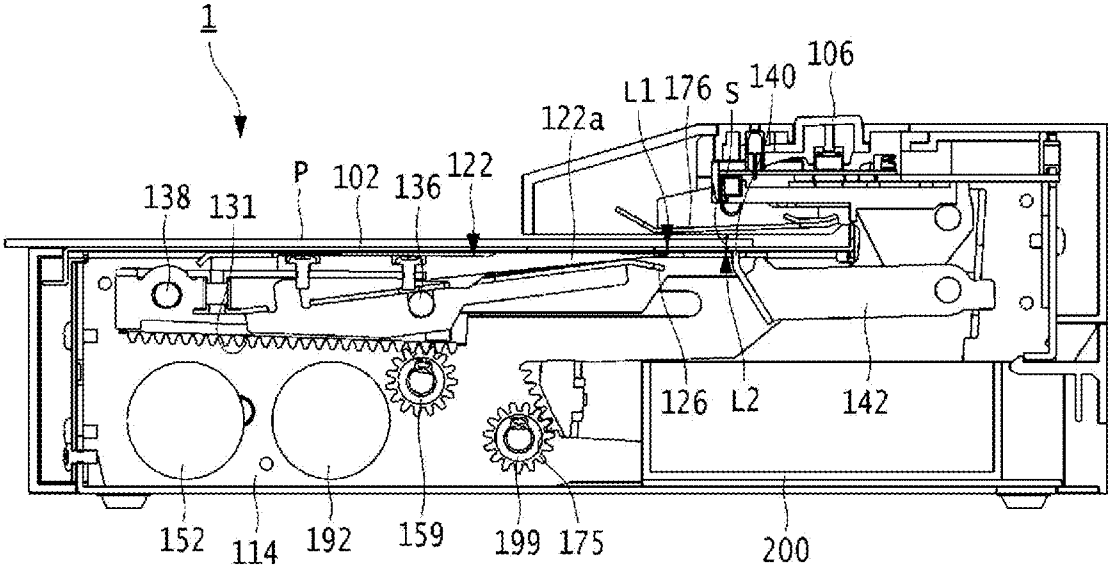
FIG. 15A is a side view showing an operation of the staple removing device when removing a staple from a sheet bundle.

As shown in FIG. 15A, when removing the staple S from the sheet bundle P, the sheet bundle P bound by the staple S is first placed on the placing table 102. A user aligns the sheet bundle P with a mark indicating the removal position L2 provided on the placing table 102, and places the crown portion Sa-side of the staple S toward the placing table. As shown in FIG. 17A, the sheet bundle P is bound by the staple S. The leg portions Sb and Sb of the staple S penetrate the sheet bundle P in the thickness direction of the sheet, are bent inwardly, and are bitten into the sheet surface.

Figure 15B:
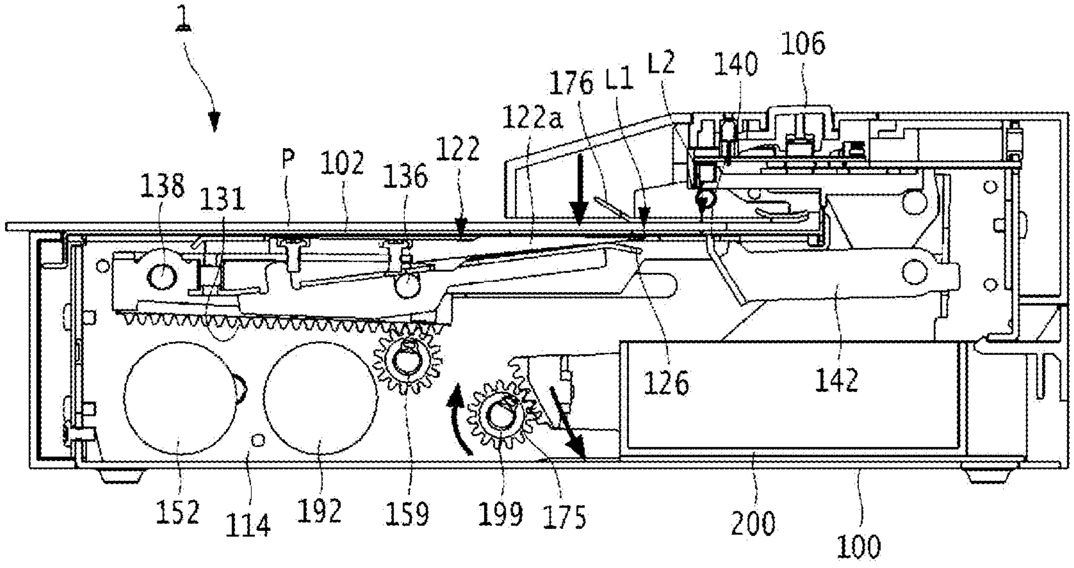
FIG. 15B is a side view showing the operation of the staple removing device when removing the staple from the sheet bundle.

Next, when the start switch 106 of the staple removing device 1 is pushed by the user, the second motor 192 is started to drive. Thereby, as shown in FIG. 15B, the sheet pressing plate 176 moves (descends) in the direction toward the placing table 102, and the sheet bundle P is pressed with a certain pressing force by the sheet pressing plate 176.

Figure 16A:
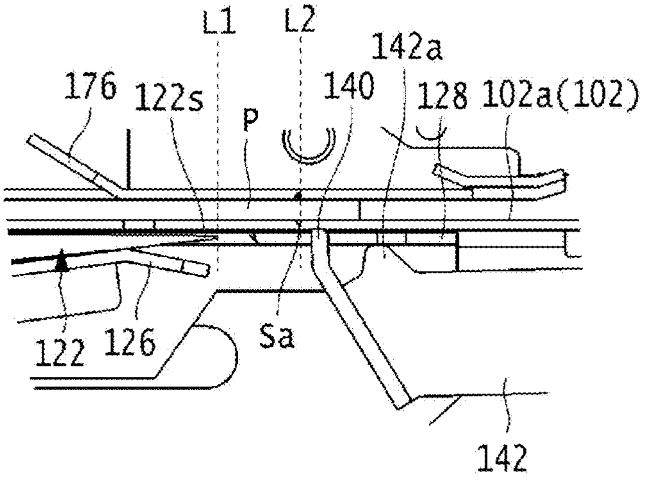
FIG. 16A is an enlarged view of main parts showing an operation of a wedge plate when removing the staple from the sheet bundle.

Subsequently, after a predetermined time has elapsed from the start of driving of the second motor 192, the first motor 152 is driven. Thereby, the pinion 159 rotates in the clockwise direction, so that the removing part 120 including the rack 131 and the wedge plate 122 moves rearward from the front. At the start of movement of the removing part 120 from the front to the rear, the tip end portion 122*s* of the wedge plate main body 122*a* is located below the placing surface 102*a* of the placing table 102, as shown in FIG. 16A, similar to the standby position L1.

Figure 16B:
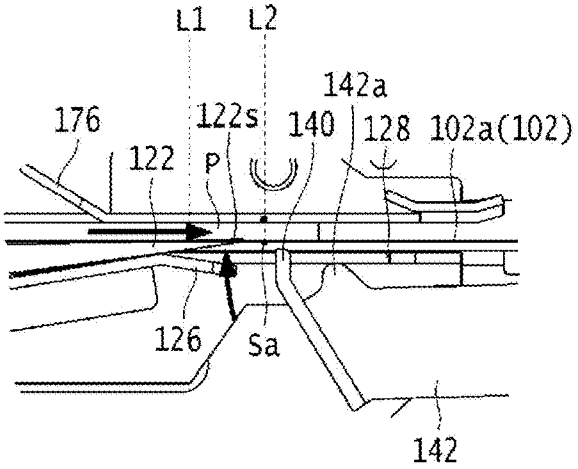
FIG. 16B is an enlarged view of main parts showing the operation of the wedge plate when removing the staple from the sheet bundle.

When the tip end-side of the removing part 120 moves rearward from the front ahead of the removal position L2, the second drive shaft 138 of the removing part 120 moves to the second groove 115*b* of the guide groove 115. Therefore, as shown in FIG. 16B, the tip end portion 122*s* of the wedge plate 122 protrudes from the placing surface 102*a* via the opening portion 102*b* of the placing table 102. The wedge plate 122 moves rearward from the front in a state where the upper surface of the wedge plate comes into contact with a back surface of the lowermost sheet of the sheet bundle P and presses the sheet bundle P.

Figure 15C:
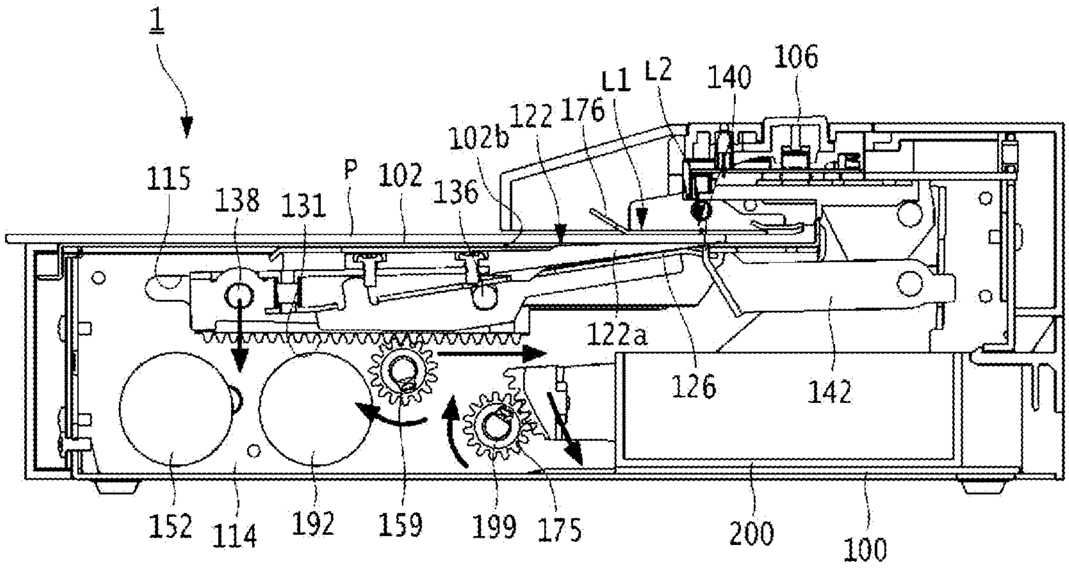
FIG. 15C is a side view showing the operation of the staple removing device when removing the staple from the sheet bundle.
Figure 16C:
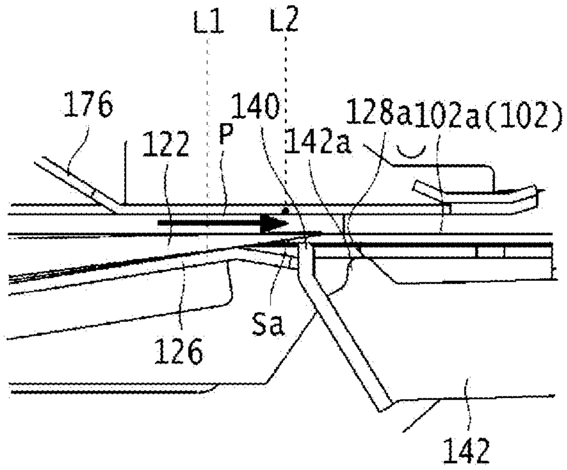
FIG. 16C is an enlarged view of main parts showing the operation of the wedge plate when removing the staple from the sheet bundle.
Figure 16D:
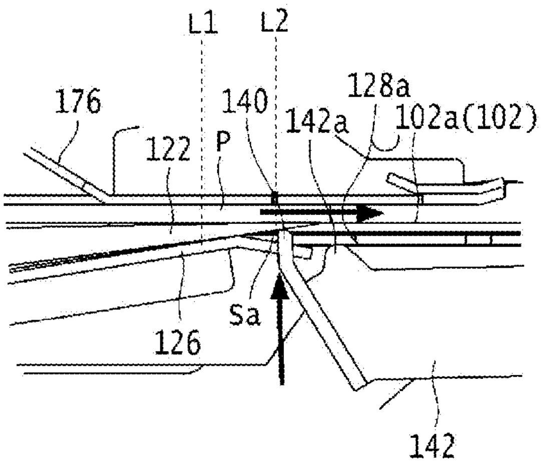
FIG. 16D is an enlarged view of main parts showing the operation of the wedge plate when removing the staple from the sheet bundle.
Figure 17B:
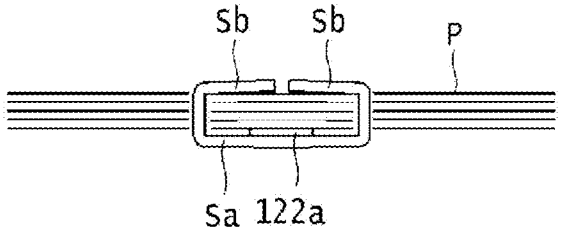
FIG. 17B shows the states of the wedge plate and the staple when removing the staple from the sheet bundle.

When the tip end-side of the wedge plate 122 moves to the removal position L2, it is pushed between the crown portion Sa and the sheet bundle P, as shown in FIGS. 15C and 16C. At this time, as shown in FIG. 17B, the leg portions Sb and Sb of the staple S shift to a state substantially parallel to the sheet surface of the sheet bundle P from the state of being bitten into the sheet surface of the sheet bundle P. When the wedge plate 122 further moves rearward from the front in this state, the convex portion 142*a* of the pressing holder 142 separates from the support portion 128*b* of the holder 128, as shown in FIG. 16D. Thereby, the pressing portion 140 ascends due to the urging of the tension spring 144, and comes into contact with the crown portion Sa on the sheet bundle P moving rearward from the front by the pushing force of the wedge plate 122, thereby restricting the forward movement of the staple S.

Figure 15D:
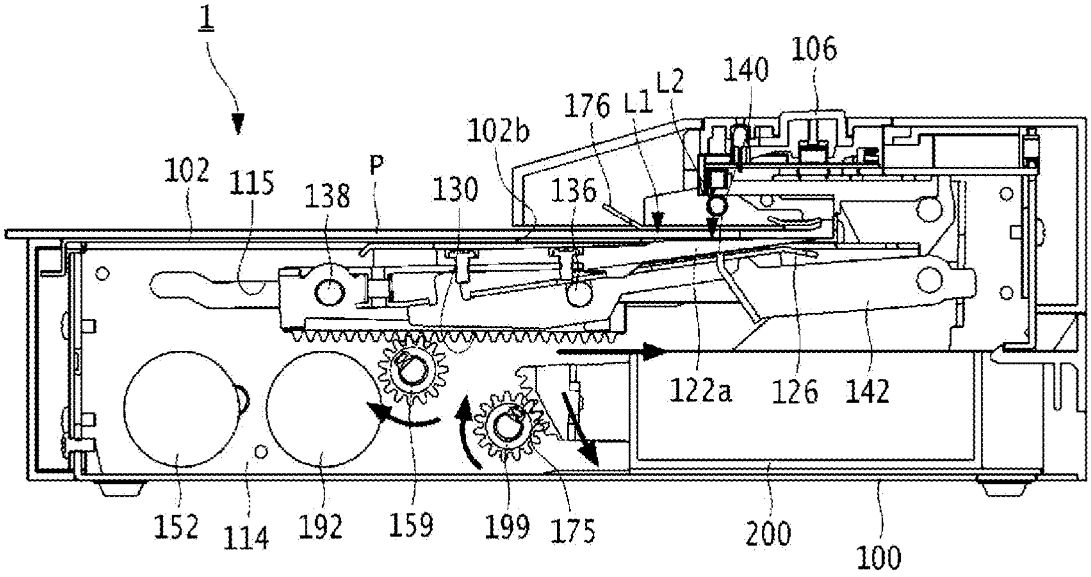
FIG. 15D is a side view showing the operation of the staple removing device when removing the staple from the sheet bundle.
Figure 15E:
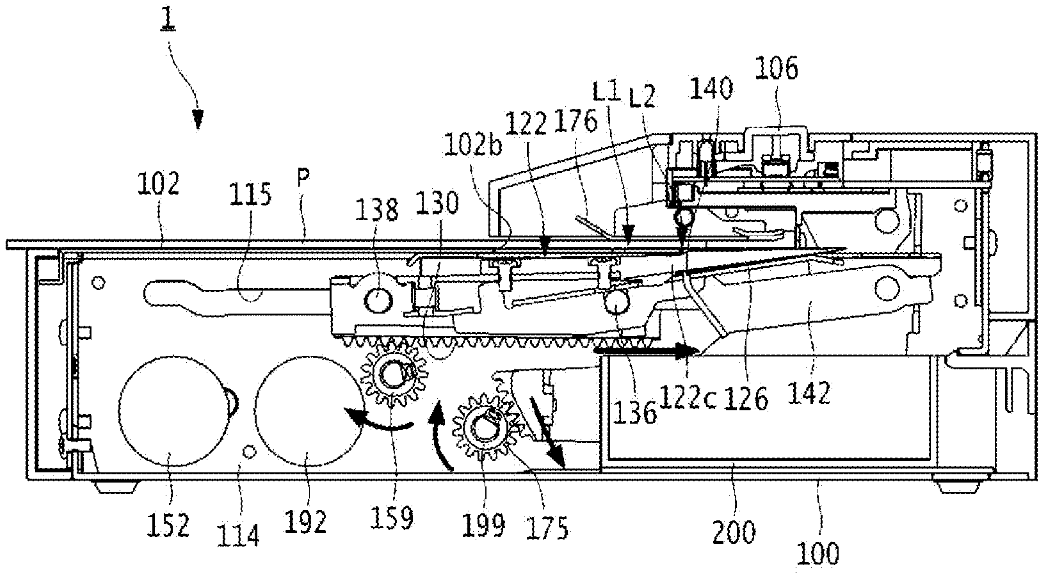
FIG. 15E is a side view showing the operation of the staple removing device when removing the staple from the sheet bundle.
Figure 16E:
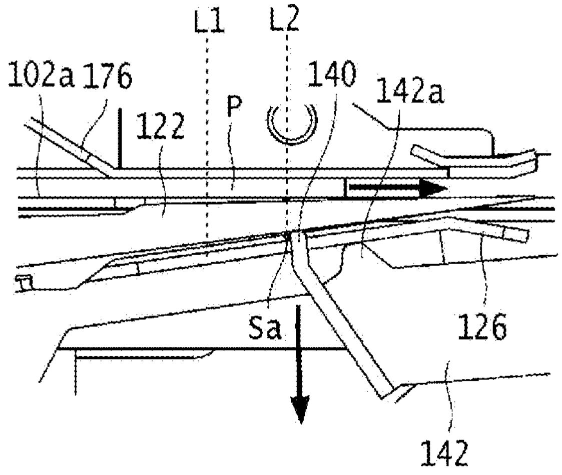
FIG. 16E is an enlarged view of main parts showing the operation of the wedge plate when removing the staple from the sheet bundle.
Figure 17C:
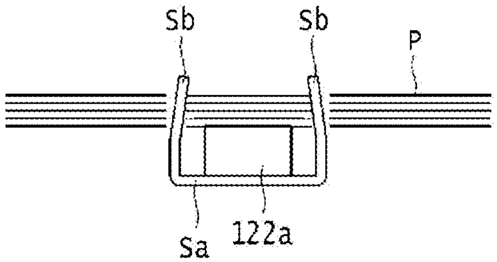
FIG. 17C shows the states of the wedge plate and the staple when removing the staple from the sheet bundle.
Figure 17D:
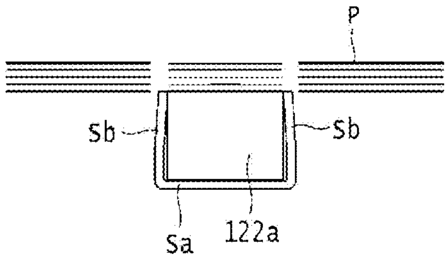
FIG. 17E shows the states of the wedge plate and the staple when removing the staple from the sheet bundle.

When the tip end-side of the wedge plate 122 passes through the removal position L2, as shown in FIGS. 15D and 16E, the thickness of the wedge plate 122 pushed between the sheet bundle P and the crown portion Sa at the removal position is increased, in side view. The pressing portion 140 accordingly descends in the thickness direction of the wedge plate 122 in the state of being in contact with the wedge plate 122 and the crown portion Sa by the extension of the tension spring 144. Thereby, as shown in FIG. 17C, the crown portion Sa is pushed in a direction away from the sheet bundle P by the wedge plate 122, and the leg portions Sb and Sb of the staple S bent inwardly extend to be substantially orthogonal to the sheet surface of the sheet bundle P. As shown in FIG. 15E, when the thickness of the wedge plate 122 at the removal position L2 becomes thicker, in side view, the leg portions Sb and Sb of the staple S are pulled out from the sheet bundle P, as shown in FIG. 17D. However, since the leg portions Sb and Sb are caught on the side surface of the wedge plate 122 due to the springback of the staple S, the staple S does not drop at this stage.

Figure 15F:
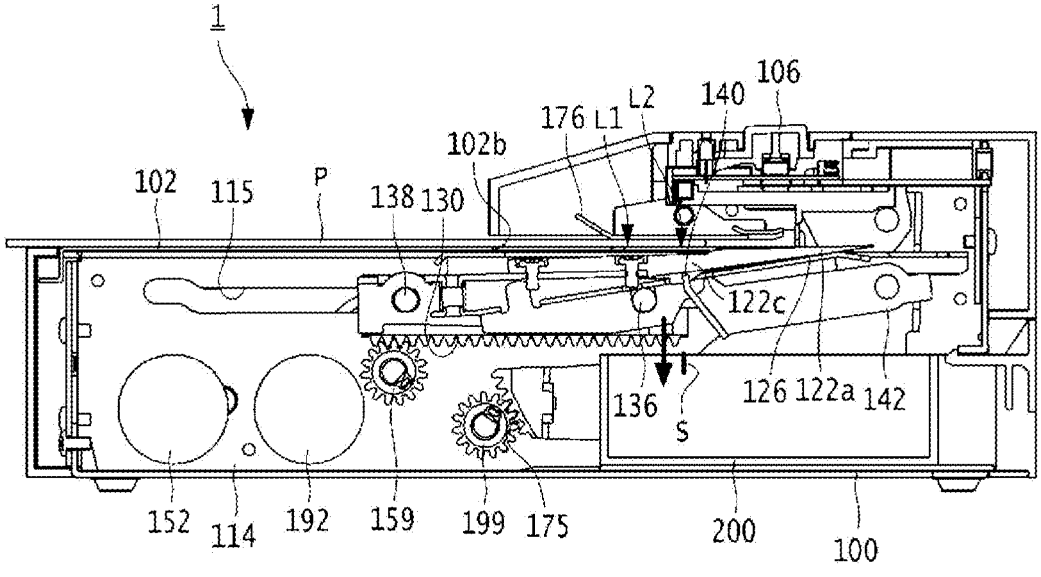
FIG. 15F is a side view showing the operation of the staple removing device when removing the staple from the sheet bundle.
Figure 17E:
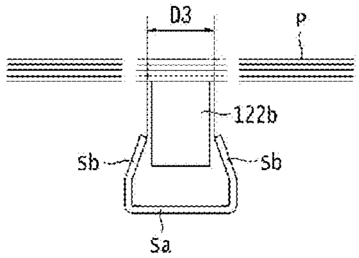

As shown in FIG. 15F, when the wedge plate 122 moves rearward from the front to the end position of the movement range, the narrowed portion 122*c* of the wedge plate 122 is located at the removal position L2. Thereby, as shown in FIG. 17E, since the dimension D1 in the width direction of the narrowed portion 122*c* of the wedge plate 122 is narrower than the dimension D3 in the width direction between the leg portions Sb and Sb of the staple S that springs back, the leg portions Sb and Sb of the staple S are separated from the side surface of the wedge plate 122, and the staple S drops into the accommodation part 200.

Figure 15G:
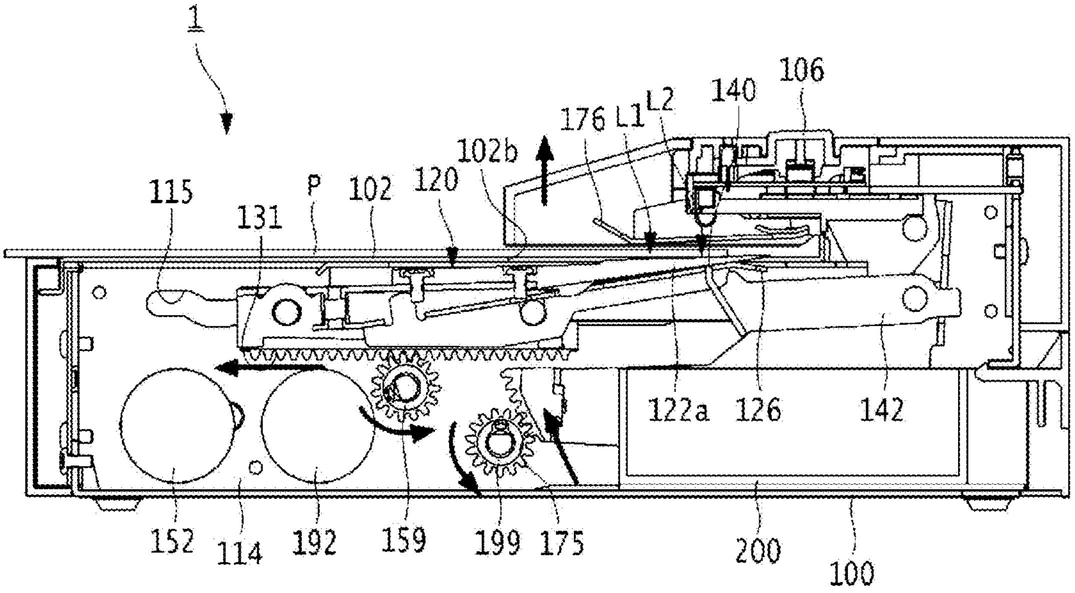
FIG. 15G is a side view showing the operation of the staple removing device when removing the staple from the sheet bundle.

As shown in FIG. 15G, when the removal of the staple S from the sheet bundle P is completed, the first motor 152 is driven in reverse rotation. Along with this, the pinion 159 reversely rotates in the counterclockwise direction, the removing part 120 including the rack 131 and the wedge plate 122 moves forward from the rear along the placing table 102, and the removing part 120 returns from the removal position L2 to the standby position L1. In addition, after a predetermined time has elapsed from the reverse rotation of the first motor 152, the second motor 192 is driven in reverse rotation. Along with this, the sheet pressing pinion 199 rotates in the counterclockwise direction and the sheet pressing rack 175 moves substantially upward, so that the sheet pressing plate 176 moves in the direction away from the placing table 102 via the hold lever 172 and returns to the standby position.

As described above, in the present embodiment, the first motor 152 and the second motor 192 are arranged directly under the removing part 120 when the wedge plate 122 of the removing part 120 is at the standby position L1. The part directly under the removing part 120 is a space part, specifically, an empty space part behind the accommodation part 200 formed by arranging the accommodation part 200 directly under the removing part 120 when the wedge plate 122 of the removing part 120 is at the removal position L2. For this reason, by effectively utilizing the space part behind the accommodation unit 200 and centrally arranging the first drive unit 150 including the first motor 152 and the second drive unit 190 including the second motor 192 in the space part, it is possible to suppress dimensions in the height direction and the width direction of the staple removing device 1, thereby miniaturizing the staple removing device 1.

In addition, according to the present embodiment, the accommodation part 200 is arranged directly under the removing part 120 when the wedge plate 122 of the removing part 120 is at the removal position L2. Therefore, the removed staple S can be dropped into the accommodation part 200, as it is. For this reason, it is not necessary to provide a mechanism such as a guide portion for guiding the removed staple S into the accommodation part 200, so that it is possible to simplify a structure of the staple removing device 1.

As described above, in the configuration of the staple removing device 1 in which the first drive unit 150 including the first motor 152 and the like and the accommodating unit 200 are provided and the wedge plate 122 moves linearly, the layout of the staple removing device 1 of the present embodiment is the most economical and optimized layout, the configuration is simple and the device can be miniaturized.

Note that, the technical scope of the present invention is not limited to the above-described embodiments, and the above-described embodiments can be variously changed without departing from the gist of the present invention. For example, the staple removing device 1 of the present embodiment can be mounted on an image forming apparatus configured to form an image on a sheet. In this case, the staple removing device 1 of the present embodiment may be arranged at a position adjacent to an operation panel of the image forming apparatus, or may be arranged inside the image forming apparatus or a post-processing apparatus connected to the image forming apparatus.

The present application is based on Japanese Patent Application No. 2019-142573 filed on Aug. 1, 2019, the contents of which are incorporated herein by reference.

REFERENCE SIGNS LIST

1: staple removing device
102: placing table
120: removing part
122: wedge plate
122*a*: wedge plate main body (first part)
122*c*: narrowed portion (third part)
122*f*: wedge plate base portion (second part)

122S: tip end portion
130, 131: rack
152: first motor
152*a*: output shaft
153*a*, 153*b*, 154*a*, 154*b*, 155: gear
158, 159: pinion
174, 175: sheet pressing rack (sheet pressing part)
176: sheet pressing plate (sheet pressing part)
192: second motor
192*a*: output shaft
193*a*, 193*b*, 194*a*, 194*b*, 195: gear
198, 199: sheet pressing pinion
200: accommodation part
L1: standby position (first position)
L2: removal position (second position)
S: staple
P: sheet bundle

The invention claimed is:

1. A staple removing device comprising:
a placing table on which a sheet bundle bound by a staple is placed;
a removing part located below the placing table, configured to remove the staple from the sheet bundle placed on the placing table, and including a tip end portion that can be inserted between the sheet bundle and the staple and is configured to be movable along the placing table between a first position and a second position and to be inserted between the sheet bundle and the staple when the tip end portion moves to the second position;
a first motor configured to move the removing part; and
an accommodation part configured to accommodate the staple removed by the removing part,
wherein the first motor is located below the removing part when the tip end portion is at the first position,
wherein the accommodation part is located below the removing part when the tip end portion is at the second position,
wherein the removing part includes the tip end portion, and has a first part configured to remove the staple from the sheet bundle, a second part configured to receive power of the first motor, and a third part located between the first part and the second part, and
wherein a dimension in a width direction of at least a portion of the third part is configured to be smaller than a dimension in the width direction of a base end portion of the first part.

2. The staple removing device according to claim 1, wherein the first motor is arranged so that an output shaft is parallel to the placing table.

3. The staple removing device according to claim 1, comprising:
a sheet pressing part having at least a part located above the placing table and configured to be movable toward the placing table and to press the sheet bundle placed on the placing table, and
a second motor configured to move the sheet pressing part,
wherein the second motor is located below the removing part when the tip end portion is at the first position.

4. The staple removing device according to claim 3, wherein the second motor is arranged so that an output shaft is parallel to the placing table.

5. The staple removing device according to claim 3, wherein an output shaft of the first motor is arranged to face toward an opposite side to an output shaft of the second motor.

6. The staple removing device according to claim 1, comprising:
a housing in which the removing part, the first motor and the accommodation part are provided, and
a first pinion part having a pair of pinions connected to an output shaft of the first motor via at least one or more gears and arranged at a predetermined interval in a width direction of the housing,
wherein the second part comprises a pair of racks extending in a traveling direction at the predetermined interval in the width direction and configured to engage with the pair of pinions.

7. The staple removing device according to claim 6, comprising:
a sheet pressing part having at least a part located above the placing table and configured to be movable toward the placing table and to press the sheet bundle placed on the placing table; and
a second motor configured to move the sheet pressing part; and
a second pinion part having a pair of pinions connected to an output shaft of the second motor via at least one or more gears and arranged at a predetermined interval in the width direction,
wherein the second motor is located below the removing part when the tip end portion is at the first position, and
wherein the sheet pressing part comprises a pair of racks extending in a height direction at the predetermined interval in the width direction and configured to engage with the pair of pinions.

8. The staple removing device according to claim 1, wherein the first motor is located directly under the removing part when the tip end portion is at the first position.

9. The staple removing device according to claim 3, wherein the second motor is located directly under the removing part when the tip end portion is at the first position.

* * * * *